(12) United States Patent
Suzuki et al.

(10) Patent No.: US 10,868,582 B2
(45) Date of Patent: Dec. 15, 2020

(54) DISPLAY DEVICE

(71) Applicant: Japan Display Inc., Tokyo (JP)

(72) Inventors: Yuji Suzuki, Tokyo (JP); Ryota Mito, Tokyo (JP); Hiroshi Mizuhashi, Tokyo (JP); Hayato Kurasawa, Tokyo (JP)

(73) Assignee: Japan Display Inc., Tokyo (JP)

( * ) Notice: Subject to any disclaimer, the term of this patent is extended or adjusted under 35 U.S.C. 154(b) by 384 days.

(21) Appl. No.: 15/904,988

(22) Filed: Feb. 26, 2018

(65) Prior Publication Data
US 2018/0254801 A1    Sep. 6, 2018

(30) Foreign Application Priority Data

Mar. 1, 2017  (JP) .................................. 2017-038716

(51) Int. Cl.
| | | |
|---|---|---|
| *H04B 5/00* | (2006.01) | |
| *F21V 8/00* | (2006.01) | |
| *G02F 1/1333* | (2006.01) | |
| *G06F 3/044* | (2006.01) | |
| *G06F 3/041* | (2006.01) | |
| *G02F 1/13357* | (2006.01) | |

(52) U.S. Cl.
CPC ......... *H04B 5/0025* (2013.01); *G02B 6/0055* (2013.01); *G02F 1/1336* (2013.01); *G02F 1/13338* (2013.01); *G06F 3/044* (2013.01); *G06F 3/0412* (2013.01); *G06F 3/0416* (2013.01); *G06F 2203/04105* (2013.01)

(58) Field of Classification Search
None
See application file for complete search history.

(56) References Cited

U.S. PATENT DOCUMENTS

| | | | | |
|---|---|---|---|---|
| 2010/0156735 A1* | 6/2010 | Nakamura | ............... | H01Q 1/38 343/788 |
| 2011/0216269 A1* | 9/2011 | Kobayashi | ............ | G02F 1/1335 349/62 |
| 2015/0077296 A1* | 3/2015 | An | ....................... | H01Q 1/2291 343/720 |
| 2015/0207205 A1* | 7/2015 | Kato | ..................... | H01Q 1/526 343/702 |

(Continued)

FOREIGN PATENT DOCUMENTS

| | | |
|---|---|---|
| JP | 2003-346094 A | 12/2003 |
| JP | 2011-205718 A | 10/2011 |
| JP | 2014-212573 A | 11/2014 |

*Primary Examiner* — Krishna P Neupane
(74) *Attorney, Agent, or Firm* — K&L Gates LLP

(57) ABSTRACT

According to an aspect, a display device includes: a display portion having a display region; a backlight configured to illuminate the display region from a back side of the display portion, the backlight including a light guide plate, and a light source provided facing a lateral side of the light guide plate and configured to emit light; an antenna electrode wound around, facing a back side of the backlight, and configured to reflect light within the display region in a plan view, the light having entered the light guide plate from the light source; and a plurality of dummy electrodes provided on a part of a plane on which the antenna electrode is provided, the part being in a region unoccupied by the antenna electrode. The dummy electrodes reflect light within the display region in a plan view, the light having entered the light guide plate from the light source.

16 Claims, 18 Drawing Sheets

(56) References Cited

U.S. PATENT DOCUMENTS

| | | | |
|---|---|---|---|
| 2015/0219948 A1* | 8/2015 | Kamimura | G02F 1/13338 349/12 |
| 2016/0187734 A1* | 6/2016 | He | G02B 6/0065 362/630 |
| 2017/0024038 A1* | 1/2017 | Noguchi | G06F 3/0412 |

* cited by examiner

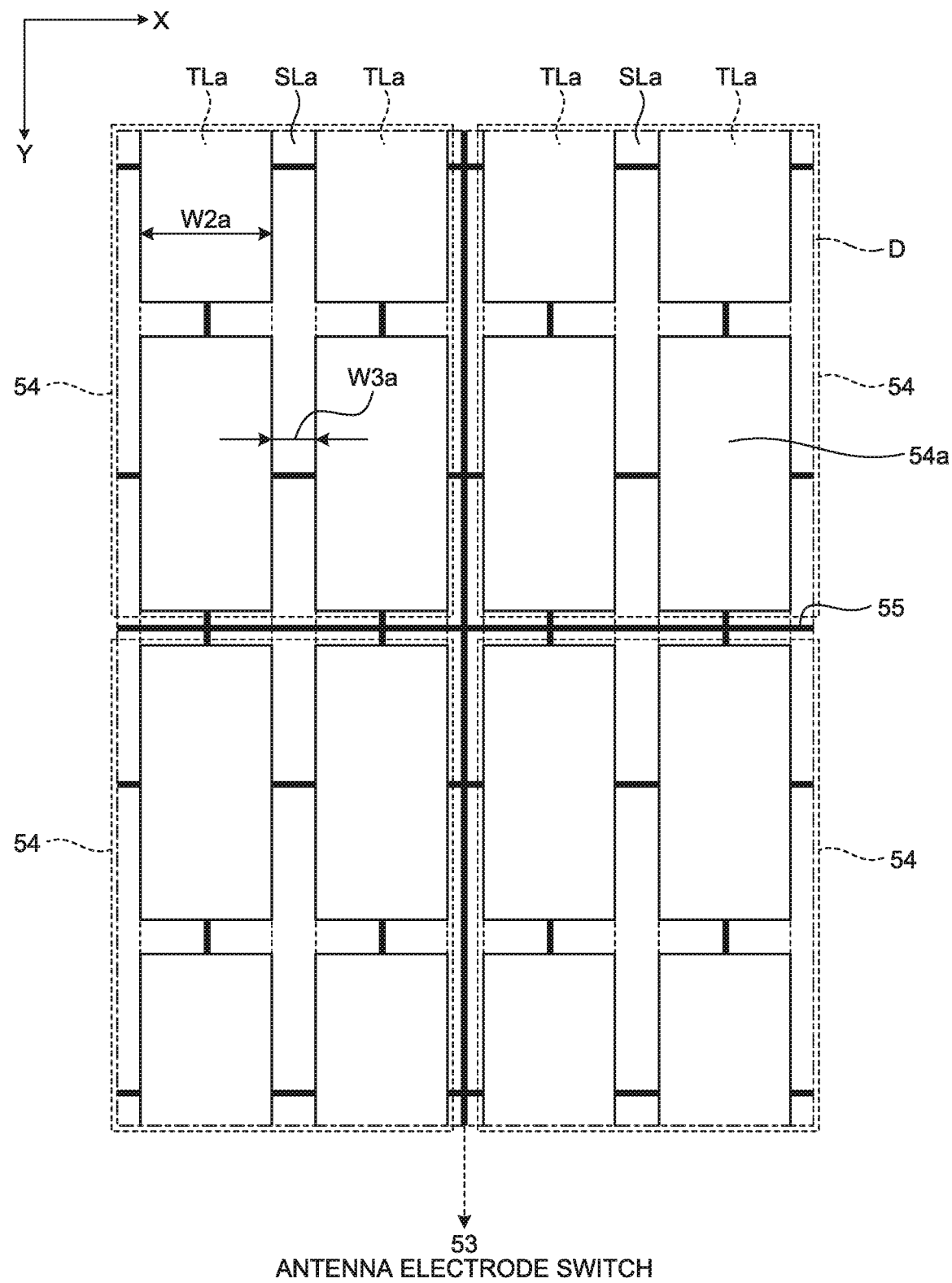

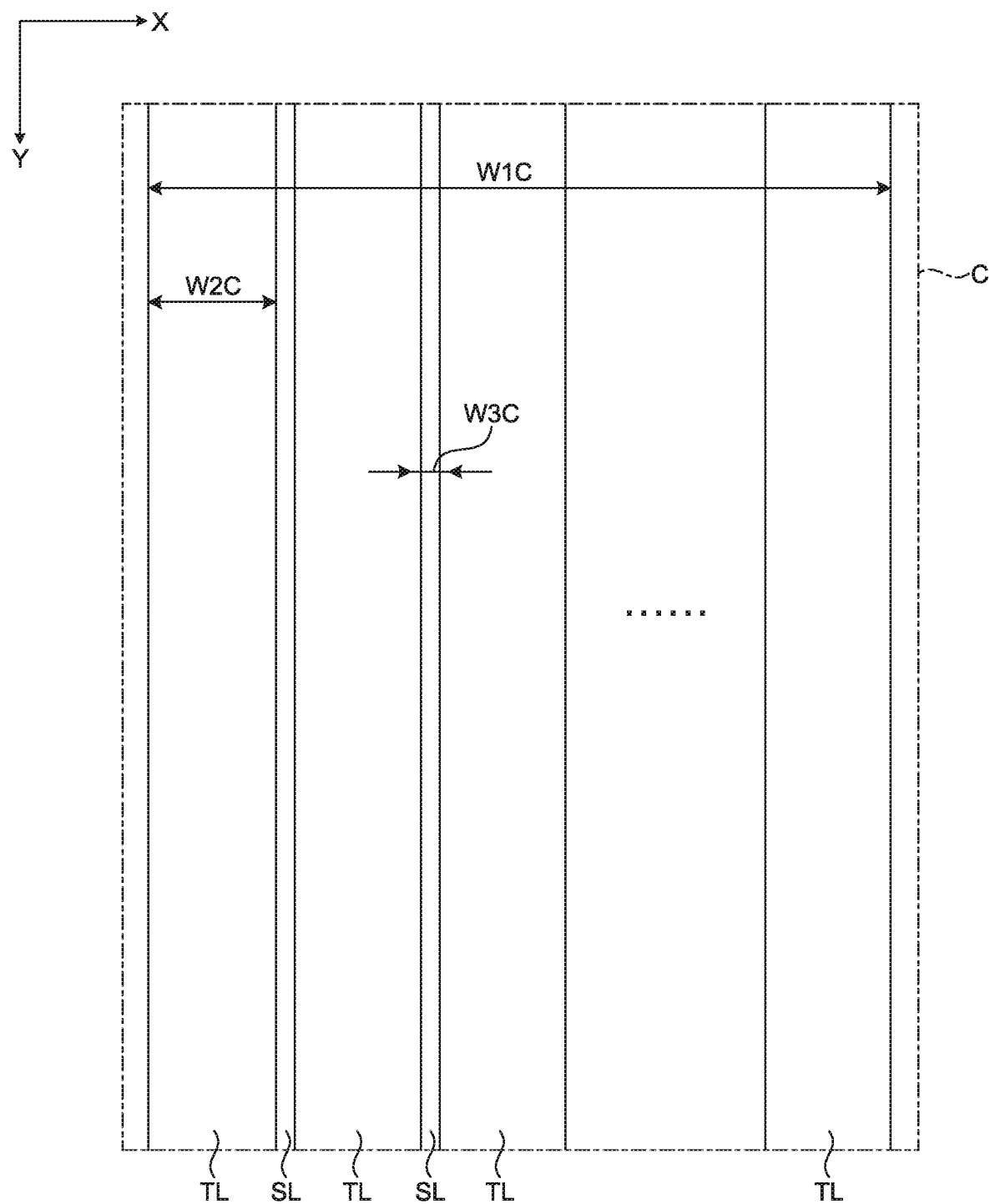

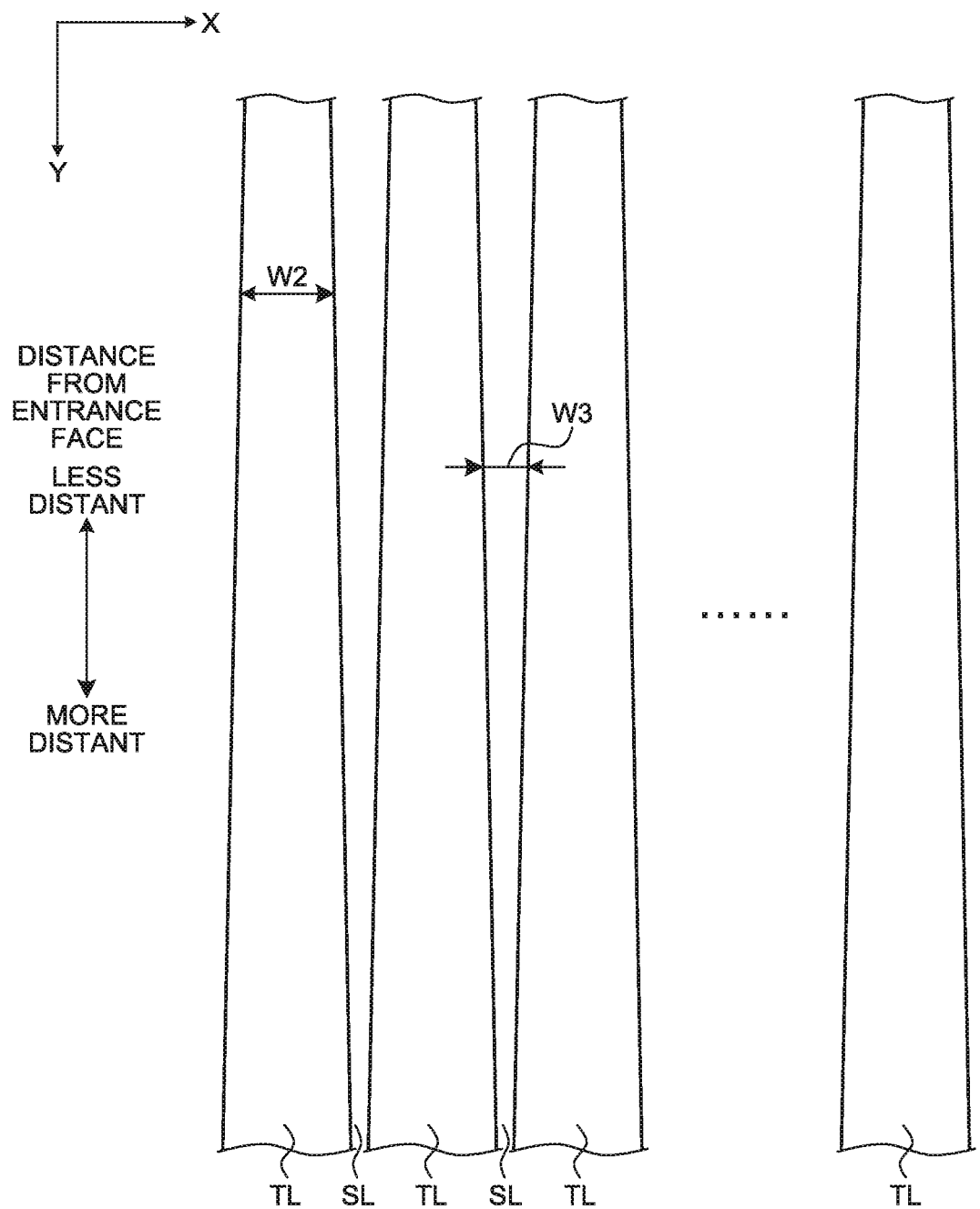

DISPLAY DEVICE

CROSS-REFERENCE TO RELATED APPLICATIONS

This application claims priority from Japanese Application No. 2017-038716, filed on Mar. 1, 2017, the contents of which are incorporated by reference herein in its entirety.

BACKGROUND

1. Technical Field

The present invention relates to a display device.

2. Description of the Related Art

In recent years, highly functional display devices have come into use as display devices, such as a liquid crystal display device, in various fields. Examples of such a highly functional display device include: a touch-detection capable display device having a touch detecting device attached thereto or integrated therewith, which is what is called a touch panel and capable of detecting an object that has approached from the outside; and a display device capable of short-range wireless communication. For example, Near Field Communication (NFC) is used as a communication protocol for performing short-range wireless communication. An antenna device has been known that uses a short-range wireless communication capability based on this NFC protocol and that is incorporated in a small communication device such as a mobile phone.

When such an antenna device is installed on a display device, the antenna device is inevitably disposed near a metal housing of the display device in some cases. In such a case, a possible configuration for preventing communication performance deterioration is to interpose a magnetic-material sheet between the antenna device and the metal housing. Such a configuration, however, can make it more costly to incorporate an NFC-based short-range wireless communication capability, and increase the thickness of the display device.

For the foregoing reasons, there is a need for a display device that can be equipped with an NFC-based short-range wireless communication capability without increasing the cost and thickening the profile of the display device.

SUMMARY

According to an aspect, a display device includes: a display portion having a display region; a backlight configured to illuminate the display region from a back side of the display portion, the backlight including a light guide plate, and a light source provided facing a lateral side of the light guide plate and configured to emit light; an antenna electrode wound around, provided facing a back side of the backlight, and configured to reflect light within the display region in a plan view, the light having entered the light guide plate from the light source; and a plurality of dummy electrodes provided on a part of a plane on which the antenna electrode is provided, the part being in a region unoccupied by the antenna electrode. The dummy electrodes reflect light within the display region in a plan view, the light having entered the light guide plate from the light source.

According to another aspect, a display device includes: a display portion having a display region; a backlight configured to illuminate the display region from a back side of the display portion, the backlight including a light guide plate, a light source provided facing a lateral side of the light guide plate and configured to emit light, and a reflective sheet configured to reflect light that has entered the light guide plate from the light source; an antenna electrode wound around, provided facing a back side of the backlight, and configured to reflect light within the display region in a plan view, the light having entered the light guide plate from the light source; a plurality of dummy electrodes provided on a part of a plane on which the antenna electrode is provided, the part being in a region unoccupied by the antenna electrode; and a detector configured to detect force applied to the display portion. The dummy electrodes reflect light within the display region in a plan view, the light having entered the light guide plate from the light source. When the detector detects the force, a drive signal is supplied to a transmission electrode in which the antenna electrode and the dummy electrodes are included. The display portion includes a reception electrode configured to generate a capacitance between the reception electrode and a corresponding one or more of the antenna electrode and the dummy electrodes. The reception electrode is configured to output a detection signal in accordance with a change in the capacitance when the detector detects the force.

BRIEF DESCRIPTION OF THE DRAWINGS

FIG. 8 is an exemplary enlarged view of a region D illustrated in FIG. 6;

FIG. 9C is an exemplary enlarged view, which is different from FIG. 7, the region C illustrated in FIG. 6;

FIG. 10 is a schematic diagram illustrating exemplary change in width of each thin-wire portion and each slit of the antenna electrode in the Y direction;

DETAILED DESCRIPTION

Figure 1:
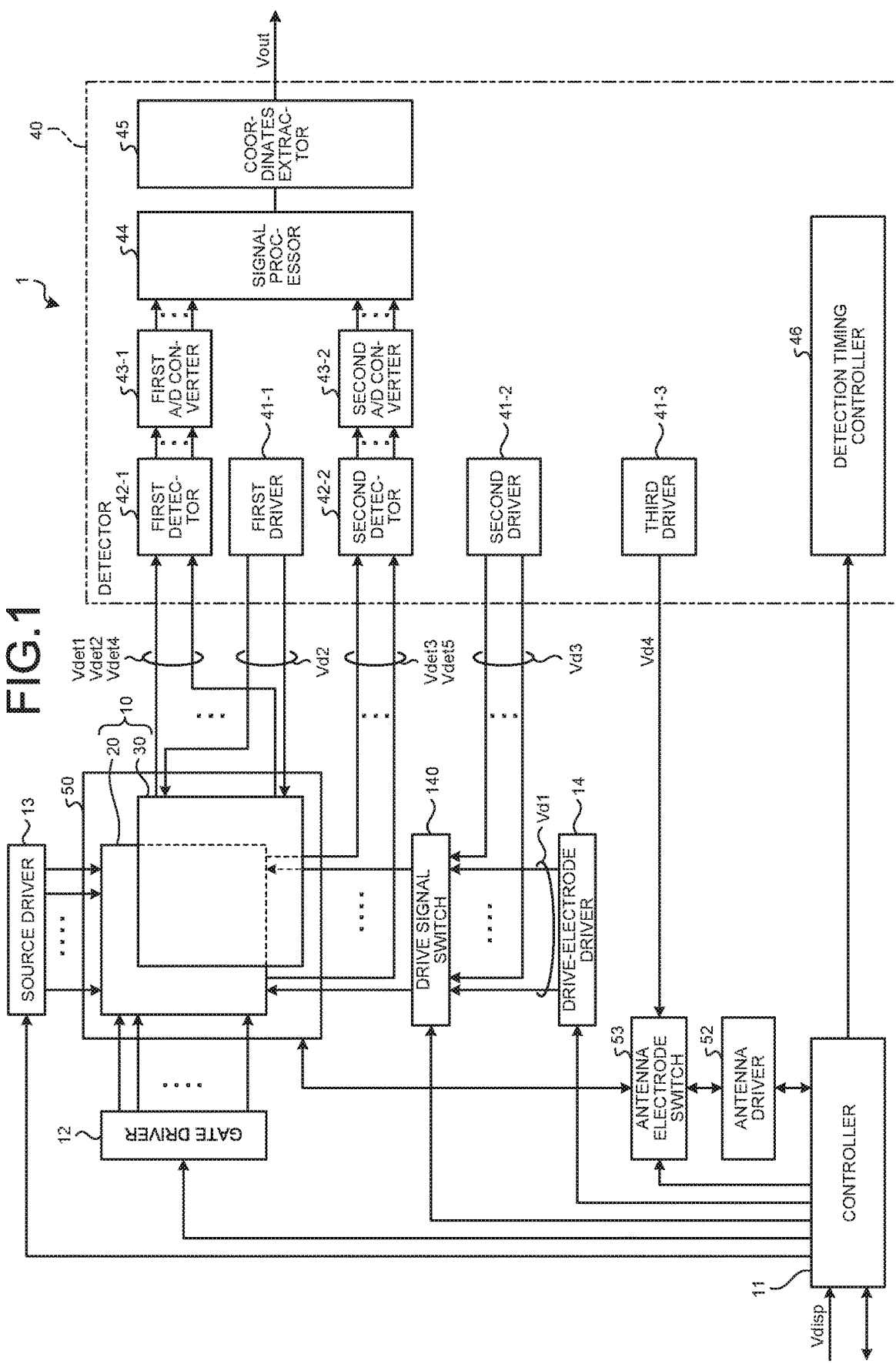
FIG. 1 is a block diagram illustrating an exemplary configuration of a display device according to an embodiment.

An embodiment for carrying out the invention is described hereinbelow in detail with reference to the drawings. Descriptions of the following embodiment are not intended to limit the present invention. The constituent elements described below include those readily apparent to the skilled person or substantially the same. Any two or more of the constituent elements described below can be used in combination as appropriate. What is disclosed herein is merely exemplary, and modifications made without departing from the spirit of the invention and readily apparent to the skilled person naturally fall within the scope of the present invention. The widths, the thicknesses, the shapes, or the like of components in the drawings may be illustrated not-to-scale, for illustrative clarity. However, the drawings are merely exemplary and not intended to limit interpretation of the present invention. Throughout the description and the drawings, the same elements as those already described with reference to the drawing already referred to are assigned the same reference signs, and detailed descriptions thereof are omitted as appropriate.

In this disclosure, when an element is described as being "on" another element, the element can be directly on the other element, or there can be one or more elements between the element and the other element.

Embodiment

FIG. 1 is a block diagram illustrating an exemplary configuration of a display device 1 according to an embodiment. The display device 1 includes a display portion 10, a controller 11, a gate driver 12, a source driver 13, a drive-electrode driver 14, a drive signal switch 140, and a detector 40. The display device 1 is a display device having a touch detection capability incorporated in the display portion 10. In this embodiment, the display portion 10 includes a display panel 20 and a touch panel 30 integrated with each other, the touch panel 30 being configured to receive a touch operation performed with, and force applied by, an object such as a finger or a stylus pen.

The display device 1 according to this embodiment further includes an antenna electrode 50 for implementing a short-range wireless communication capability based on a protocol such as Near Field Communication (NFC), an antenna driver 52, an antenna electrode switch 53, and a backlight (described later) that emits light from the back side of the display portion 10.

The display device 1 detects touch operations and coordinates at which the touch operations have been performed, by the combined use of: a mutual-capacitance scheme using the mutual capacitances between detection electrodes TDL described later and drive electrodes COML described later; a self-capacitance scheme using the detection electrodes TDL; and a self-capacitance scheme using the drive electrodes COML. The process for detecting a touch position may be performed by using the mutual-capacitance scheme or using the mutual-capacitance scheme and at least one of the self-capacitance schemes.

In the process for detecting a touch position of this embodiment, which is performed by the above-described mutual-capacitance scheme using mutual capacitances between the detection electrodes TDL and the drive electrodes COML, the detection electrodes TDL are used for detecting a touch operation and coordinates at which the touch operation has been performed, and the drive electrodes COML are used as drive electrodes for the process for detecting the touch position. In an image display process, the drive electrodes COML are used as common electrodes for subjecting a plurality of pixel electrodes of the display panel 20 to the same potential. When a touch operation has been performed by the combined use of the self-capacitance scheme using the detection electrodes TDL and the self-capacitance scheme using the drive electrodes COML, the display device 1 detects the coordinates at which the touch operation has been performed, in the following manner: the display device 1 drives the detection electrodes TDL and then detects changes of the self-capacitances of the respective detection electrodes TDL to determine one of the coordinates of the touch detection position in a direction in which the detection electrodes TDL are arranged; and the display device 1 drives the drive electrodes COML and then detects changes of the self-capacitances of the respective drive electrodes COML to determine the other coordinate of the touch detection position in a direction in which the drive electrodes COML are arranged.

The display device 1 uses the detection electrodes TDL and/or the drive electrodes COML to calculate the amount of force applied to the display portion 10 when a touch operation is performed.

The display device 1 according to this embodiment carries out an image display process, a touch-position detection process, and a force detection process by switching between display periods in which to perform the image display process on the display panel 20, touch-position detection periods in which to perform the touch-position detection process, and force detection periods in which to perform the force detection process. The display device 1 according to this embodiment implements a short-range wireless communication capability using the antenna electrode 50 and the antenna driver 52, for example, in response to a short-range wireless communication command from an external host integrated circuit (IC) not illustrated.

The gate driver 12 is a component that performs the function of, based on control signals supplied from the controller 11, sequentially selecting, one by one, horizontal lines to be driven for display of the display portion 10.

The source driver 13 is a component that, based on control signals supplied from the controller 11, supplies pixel signals Vpix to respective sub-pixels SPix (described later) of the display portion 10.

The drive-electrode driver 14 is a component that, based on control signals supplied from the controller 11 via a drive signal switch 140, supplies drive signals to the drive electrodes COML (described later) of the display portion 10.

As described later, the display panel 20 performs display by sequentially scanning horizontal lines one by one in accordance with scanning signals Vscan supplied from the gate driver 12.

The touch panel 30 operates based on the basic principles of a capacitive touch detection process and a capacitive force detection process. Detailed descriptions of the basic principles of a capacitive touch detection process and a capacitive force detection process are omitted herein.

The detector 40 includes a first driver 41-1, a second driver 41-2, a third driver 41-3, a first detector 42-1, a second detector 42-2, a first A/D converter 43-1, a second A/D converter 43-2, a signal processor 44, a coordinates extractor 45, and a detection timing controller 46.

The antenna electrode 50 functions as an NFC antenna for NFC. NFC is a short-range wireless communication technique using a frequency of about 13.56 MHz for a communication distance of about 10 cm.

The type of the antenna electrode 50 is not limited. As NFC, NFC-Type F, NFC-Type A, and NFC-Type B are applicable, for example. Examples of a short-range wireless communication technique in a broader sense include radio frequency identifiers (RFID), which use electromagnetic fields and radio waves. The RFIDs encompass general short-range wireless communication techniques, and includes NFC, which is standardized in compliance with certain criteria. In this embodiment, the antenna electrode 50 is applicable to the RFIDs. Examples of a type of RFID include a passive type, an active type, and a semi-active type. The passive type enables a device to operate, without a built-in battery, with electromagnetic waves emitted from a reader. The active type enables a device to emit electromagnetic waves with a built-in battery. The semi-active type is obtained by combining the passive type and the active type. Various types of antenna for RFIDs adopt basically the same transmission and reception methods. In this embodiment, any of those types of antenna is installable on the display device 1.

In this embodiment, the antenna electrode 50 also functions as a drive electrode for determining the amount of force applied to the display portion 10.

The antenna driver 52 is a component that drives the antenna electrode 50 to cause the antenna electrode 50 to function as an NFC antenna.

An antenna electrode switch 53 switches between an antenna drive signal from the antenna driver 52 and a fourth drive signal Vd4 from the third driver 41-3 of the detector 40.

The touch position detection process and the force detection process according to this embodiment are described here.

When the touch position detection process is performed by the mutual-capacitance scheme using mutual capacitances between the detection electrodes TDL and the drive electrodes COML (this detection process is referred to also as a "first touch position detection process"), the touch panel 30 receives a first drive signal Vd1 from the drive-electrode driver 14 via the drive signal switch 140 and outputs first detection signals Vdet1 to the first detector 42-1.

When the touch position detection process is performed by the self-capacitance scheme using the detection electrodes TDL (this detection process is referred to also as a "second touch position detection process"), the touch panel 30 receives a second drive signal Vd2 from the first driver 41-1 of the detector 40 and outputs second detection signals Vdet2 to the first detector 42-1.

When the touch position detection process is performed by the self-capacitance scheme using the drive electrodes COML (this detection process is also referred to as a "third touch position detection process"), the touch panel 30 receives a third drive signal Vd3 from the second driver 41-2 of the detector 40 via the drive signal switch 140 and outputs third detection signals Vdet3 to the second detector 42-2.

When force applied to the display portion 10 is measured, the third driver 41-3 of the detector 40 outputs a fourth drive signal Vd4, and the antenna electrode 50 receives the fourth drive signal Vd4 via the antenna electrode switch 53.

When force applied to the display portion 10 is measured by using the detection electrodes TDL (this detection process is also referred to as a "first force detection process"), the touch panel 30 outputs fourth detection signals Vdet4 to the first detector 42-1.

When force applied to the display portion 10 is measured by using the drive electrodes COML (this detection process is also referred to as a "second force detection process"), the touch panel 30 outputs fifth detection signals Vdet5 to the second detector 42-2.

That is, the detector 40 performs the first touch detection process, the second touch detection process, or the third touch detection process based on the first detection signals Vdet1, the second detection signals Vdet2, or the third detection signals Vdet3 supplied from the touch panel 30, and performs the first force detection process or the second force detection process based on the fourth detection signals Vdet4 or the fifth detection signals Vdet5 supplied from the touch panel 30. More specifically, the detector 40 performs the first touch detection process based on the first detection signals Vdet1 supplied from the touch panel 30. The detector 40 performs the second touch detection process based on the second detection signals Vdet2 supplied from the touch panel 30. The detector 40 performs the third touch detection process based on the third detection signals Vdet3 supplied from the touch panel 30. The detector 40 performs the first force detection process based on the fourth detection signals Vdet4 supplied from the touch panel 30. The detector 40 performs the second force detection process based on the fifth detection signals Vdet5 supplied from the touch panel 30.

The first driver 41-1 supplies the second drive signal Vd2 to the detection electrodes TDL described later of the touch panel 30 illustrated in FIG. 1. Charges are supplied to the respective detection electrodes TDL in accordance with this second drive signal Vd2.

The second driver 41-2 supplies the third drive signal Vd3 to the drive electrodes COML described later of the touch panel 30 illustrated in FIG. 1. Charges are supplied to the respective drive electrodes COML in accordance with this third drive signal Vd3 or a fifth drive signal Vd5.

The third driver 41-3 supplies the fourth drive signal Vd4 to the antenna electrode 50. A charge is supplied to the antenna electrode 50 via the antenna electrode switch 53 in accordance with the fourth drive signal Vd4.

The first detector 42-1 amplifies the first detection signals Vdet1, the second detection signals Vdet2, and the fourth detection signals Vdet4 supplied from the detection electrodes TDL, which will be described later, of the touch panel 30 illustrated in FIG. 1. The first detector 42-1 may include an analog low pass filter (LPF) that outputs signals obtained by removing high-frequency components (noise components) included in the first detection signals Vdet1, the second detection signals Vdet2, and the fourth detection signals Vdet4.

The first A/D converter 43-1 performs analog-to-digital (A/D) conversion on an analog signal output from the first detector 42-1 and outputs the obtained signal to the signal processor 44.

The second detector 42-2 amplifies the third detection signals Vdet3 and the fifth detection signals Vdet5 supplied from the drive electrodes COML, which will be described later, of the touch panel 30 illustrated in FIG. 1. The second detector 42-2 may include an analog LPF that outputs signals obtained by removing high-frequency components (noise components) included in the third detection signals Vdet3 and the fifth detection signals Vdet5.

The second A/D converter 43-2 performs A/D conversion on an analog signal output from the second detector 42-2 and outputs the obtained signal to the signal processor 44.

The signal processor 44 is a component that performs the above-described first touch detection process, second touch detection process, third touch detection process, first force detection process, or second force detection process based on signals output from the first A/D converter 43-1 and the second A/D converter 43-2.

The coordinates extractor 45 is a component that, based on the processing result of the signal processor 44, extracts: coordinates at which a touch operation has been performed on the touch panel 30; and force applied to the coordinates.

The controller 11 is a component that, based on video signals Vdisp supplied from the external host IC (not illustrated), supplies control signals to the gate driver 12, the source driver 13, the drive-electrode driver 14, and the detection timing controller 46 of the detector 40 to control these components to operate synchronously with one another, for example. The controller 11 also controls the antenna driver 52 and the antenna electrode switch 53 based on the short-range wireless communication command from the external host IC (not illustrated), for example.

This controller 11 includes a clock generator (not illustrated) that generates a reference clock. Based on the reference clock generated by the clock generator, the controller 11 generates control signals to be supplied to the gate driver 12, the source driver 13, the drive-electrode driver 14, the detection timing controller 46 of the detector 40, the antenna driver 52, and the antenna electrode switch 53.

Figure 2:
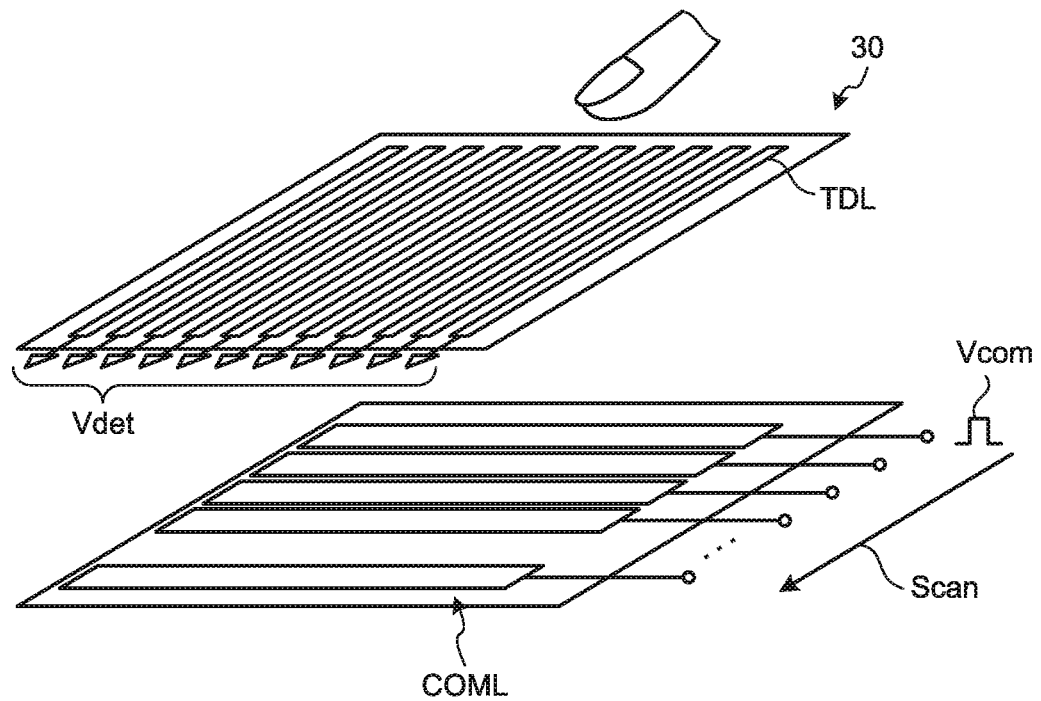
FIG. 2 perspectively illustrates a positional relation between drive electrodes and detection electrodes.

FIG. 2 perspectively illustrates a positional relation between drive electrodes and detection electrodes. The drive electrodes COML form stripe-like electrode patterns individually extending in the same direction. When the first touch detection process is performed by using the mutual capacitance scheme using mutual capacitances between the detection electrodes TDL and the drive electrodes COML, the first drive signals Vd1 are sequentially applied to the respective electrode patterns from the drive-electrode driver 14 via the drive signal switch 140, so that the electrode patterns are sequentially scanned to be driven in a time-division manner. The detection electrodes TDL form stripe-like electrode patterns individually extending in a direction intersecting the direction in which the electrode patterns formed by the drive electrodes COML extend. The detection electrodes TDL are provided facing the drive electrodes COML in a direction perpendicular to a plane on which the drive electrodes COML are provided. Capacitances are generated at intersections of the electrode patterns of the drive electrodes COML and the electrode patterns of the detection electrodes TDL.

Figure 3:
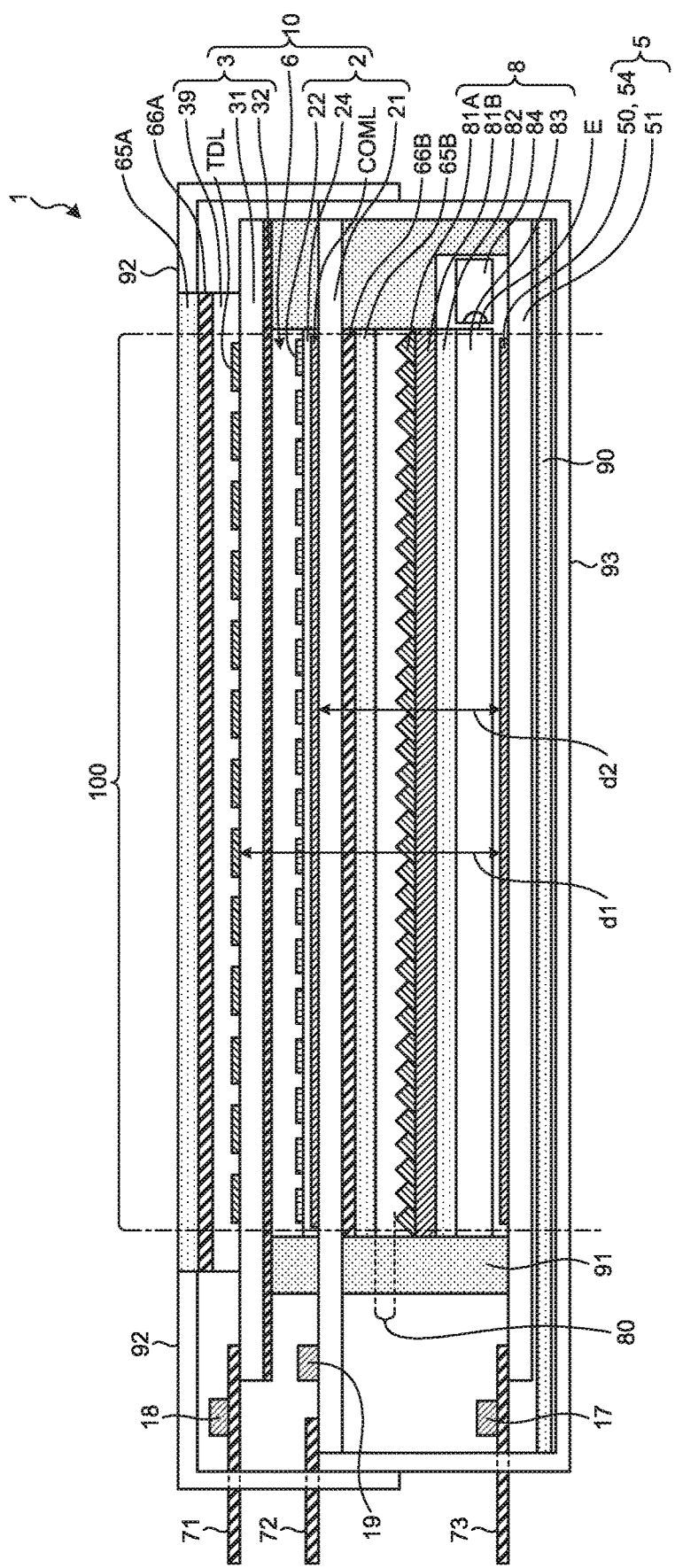
FIG. 3 is a schematic diagram representing a sectional structure of a display device according to the embodiment.
Figure 4:
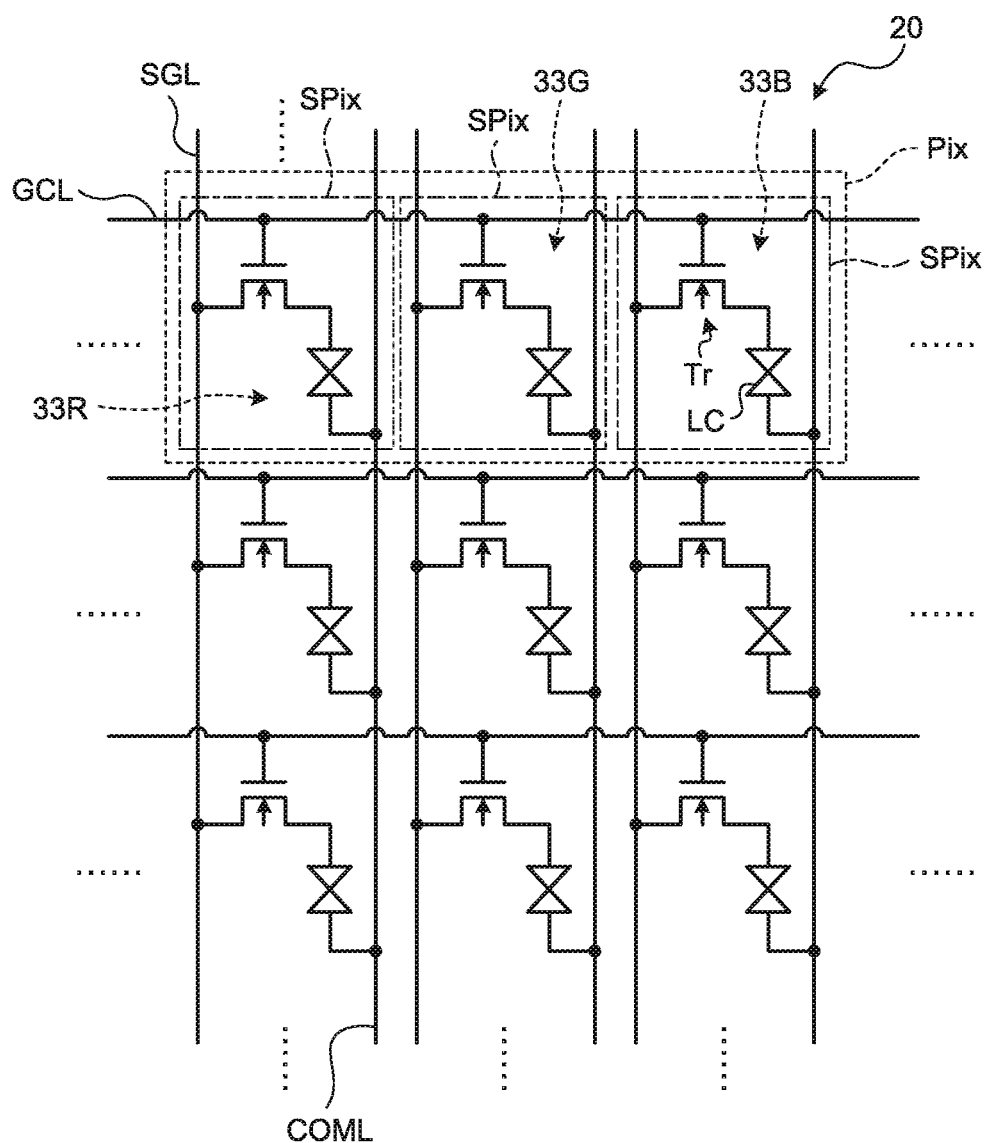
FIG. 4 is a circuit diagram representing a pixel array of a display device according to the embodiment.
Figure 5:
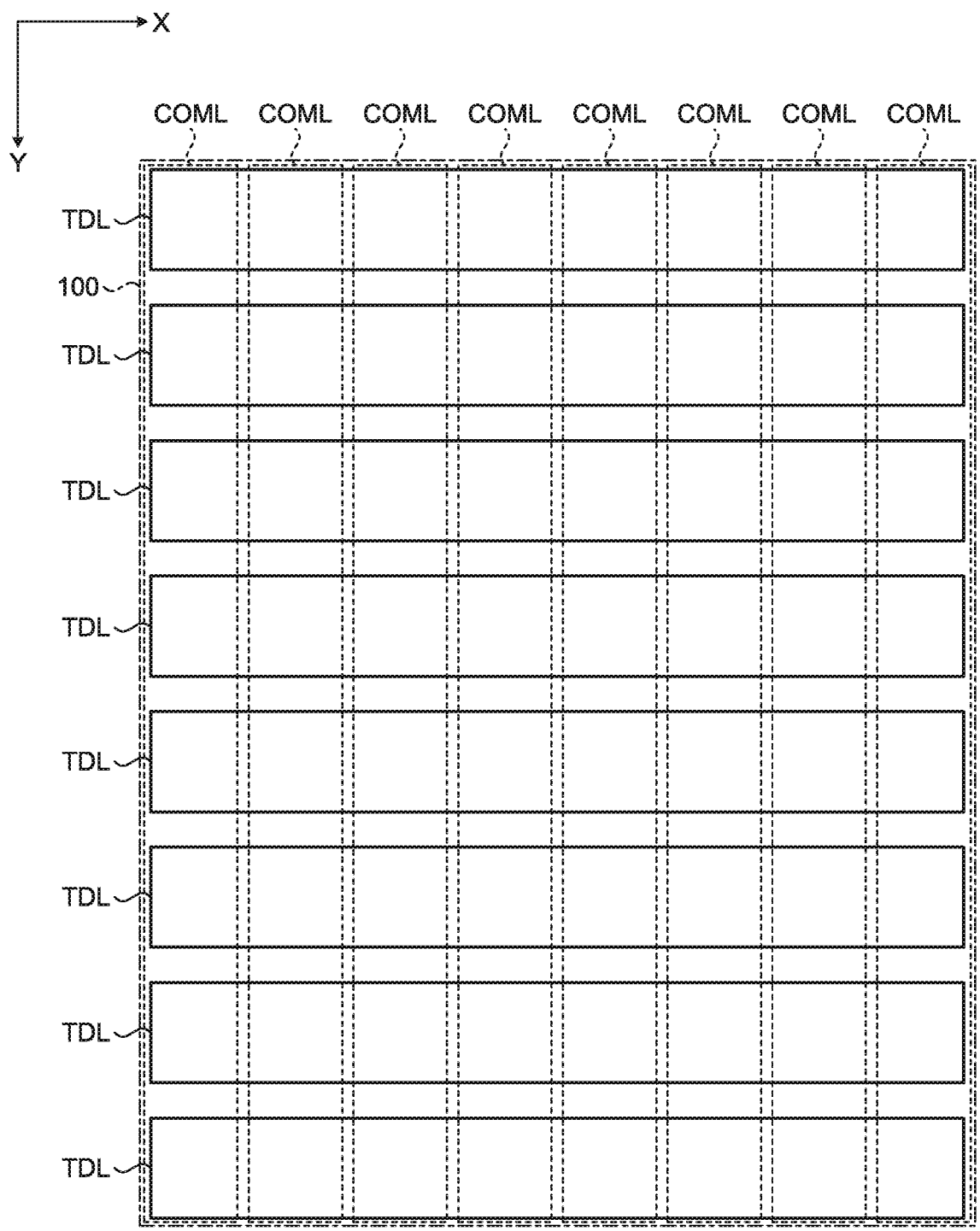
FIG. 5 illustrates exemplary arrangement of the drive electrodes and the detection electrodes of the display device according to the embodiment.

Next, an exemplary configuration of the display device 1 of this embodiment is described. FIG. 3 is a schematic diagram representing a sectional structure of a display device according to the embodiment. FIG. 4 is a circuit diagram representing a pixel array of a display device according to the embodiment. FIG. 5 illustrates exemplary arrangement of the drive electrodes and the detection electrodes of the display device according to the embodiment. While an example in which eight detection electrodes TDL intersect eight drive electrodes COML is illustrated in FIG. 5, the number of the detection electrodes TDL and the number of the drive electrodes COML are not limited thereto.

As illustrated in FIG. 3 and FIG. 5, the display device 1 has a display region 100 for displaying images on the display portion 10. The display region 100 is a region within which images are displayed, and is a rectangular region having two opposed long sides and two opposed short sides.

As illustrated in FIG. 3, the display device 1 according to the embodiment includes a pixel substrate 2, a counter substrate 3, a liquid crystal layer 6, a backlight 8, an antenna substrate 5, and a magnetic-material sheet 90. The counter substrate 3 is disposed facing the pixel substrate 2. The liquid crystal layer 6 serves as a display function layer and is interposed between the pixel substrate 2 and the counter substrate 3. The backlight 8 is disposed facing a side of the pixel substrate 2 opposite to a side thereof facing the counter substrate 3. The antenna substrate 5 is disposed facing a side of the backlight 8 opposite to a side thereof facing the pixel substrate 2. The magnetic-material sheet 90 is disposed facing a side of the antenna substrate 5 opposite to a side thereof facing the backlight 8. Descriptions of the embodiment assume that the display portion 10 is composed of components including the pixel substrate 2, the counter substrate 3, and the liquid crystal layer 6, excluding the backlight 8, the antenna substrate 5, and the magnetic-material sheet 90.

The pixel substrate 2 includes a first substrate 21 as a circuit substrate, pixel electrodes 22, the drive electrodes COML, and an insulating layer 24. On the first substrate 21, thin film transistors (TFTs) as switching elements are disposed corresponding to the respective pixel electrodes 22. The pixel electrodes 22 are provided above the first substrate 21, that is, provided facing a side thereof that faces the counter substrate 3, and are arranged in a matrix (row-column configuration) in a plan view. The drive electrodes COML are provided between the first substrate 21 and the pixel electrodes 22. The insulating layer 24 insulates the pixel electrodes 22 from the drive electrodes COML. A polarizing plate 65B is provided under the lower side of the first substrate 21 with an adhesive layer 66B interposed therebetween.

The first substrate 21 has a display control-use IC 19 thereon. The first substrate 21 also has a flexible substrate 72 coupled thereto. The display control-use IC 19 is a chip mounted on the first substrate 21 through a chip-on-glass (COG) process, and has the controller 11 incorporated therein. The display control-use IC 19 outputs control signals to scanning signal lines GCL described later, pixel signal lines SGL described later, and the like, based on video signals Vdisp (see FIG. 1) supplied from the external host IC (not illustrated), for example.

The counter substrate 3 includes a second substrate 31 and a color filter 32 formed on one surface of the second substrate 31. The detection electrodes TDL are provided on the other surface of the second substrate 31. A protective layer 39 is provided on the detection electrodes TDL. A polarizing plate 65A is further provided above the detection electrodes TDL with an adhesive layer 66A interposed therebetween. A flexible substrate 71 is coupled to the second substrate 31. A touch detection-use IC 18 is mounted on the flexible substrate 71. The touch detection-use IC 18 has the detector 40, illustrated in FIG. 1, implemented therein. Any part of the functions of the detector 40 may be provided as a function or functions of at least one other micro-processing unit (MPU). Specifically, while various functions, such as A/D conversion and noise cancellation, can be provided as the functions of the touch detection-use IC 18, at least one (such as noise cancellation) of these functions may be implemented in a circuit, such as an MPU, provided separately from the touch detection-use IC 18. The color filter 32 may be disposed on the first substrate 21.

The first substrate 21 and the second substrate 31 are made of, for example, glass substrates. The first substrate 21 and the second substrate 31 are disposed, facing each other with a resin frame 91 interposed therebetween, a certain distance away from each other. The liquid crystal layer 6 is provided between the first substrate 21 and the second substrate 31 and is sealed by the resin frame 91. The liquid crystal layer 6 serves to modulate, in accordance with conditions of electric fields therein, light passing therethrough. For the liquid crystal layer 6, liquid crystal of the transverse electric field mode, such as the in-plane switching (IPS) mode, is used. Examples of IPS mode include, but are not limited to, the fringe field switching (FFS) mode. Orientation films are disposed between the liquid crystal layer 6 and the pixel substrate 2 and between the liquid crystal layer 6 and the counter substrate 3, respectively, in the illustration of FIG. 3.

As illustrated in FIG. 4, the display panel 20 includes a plurality of sub-pixels SPix arranged in a matrix (row-column configuration). Each of the sub-pixels SPix includes a TFT element Tr and a liquid crystal capacitor LC. The TFT element TR is formed of a thin-film transistor and, in this example, is formed of an n-channel metal-oxide-semiconductor (MOS) thin-film transistor (TFT). The source of the TFT element Tr is coupled to one of the pixel signal lines SGL, the gate thereof is coupled to one of the scanning signal lines GCL, and the drain thereof is coupled to one end of the liquid crystal capacitor LC. The liquid crystal capacitor LC has the one end coupled to the drain of the TFT element Tr and the other end coupled to one of the drive electrodes COML.

The thin film transistor (TFT) elements Tr included in the respective sub-pixels SPix forming pixels Pix illustrated in FIG. 4 are disposed on the first substrate 21. Wiring including the pixel signal lines SGL and the scanning signal lines GCL is also disposed on the first substrate 21. The pixel signal lines SGL supply pixel signals Vpix to the respective pixel electrodes 22. The scanning signal lines GCL drive the TFT elements Tr. Thus, the pixel signal lines SGL extend on a plane parallel to a surface of the first substrate 21 and supply, to the pixels, pixel signals Vpix for displaying an image.

As illustrated in FIG. 4, pixel regions 33R, 33G, and 33B provided in the color filter 32 and colored in, for example, three colors of red (R), green (G), and blue (B) are formed corresponding to the respective sub-pixels SPix. Each pixel Pix consists of one set of the sub-pixels SPix corresponding to one of the pixel regions 33R, one of the pixel regions 33G, and one of the pixel regions 33B. A combination of colors to be used for coloring the color filter 32 are not limited to the above combination of three colors, and any combination of colors that are different from each other may be used therefor. A combination of colors to be used for coloring the color filter 32 are not limited to the above combination of three colors, and a combination of four or more colors may be used therefor.

Each of the sub-pixels SPix that belong to a row of the display panel 20 is coupled by one of the scanning signal lines GCL to the other sub-pixels SPix that belong to that row. The scanning signal lines GCL are coupled to the gate driver 12 and are supplied with scanning signals Vscan by the gate driver 12. Each of the sub-pixels SPix that belong to a column of the display panel 20 is coupled by one of the pixel signal lines SGL to the other sub-pixels SPix that belong to that column. The pixel signal lines SGL are coupled to the source driver 13 and are supplied with pixel signals Vpix by the source driver 13. Each of the sub-pixels SPix that belong to a column of the display panel 20 is coupled by one of the drive electrodes COML to the other sub-pixels SPix that belong to that column. The drive electrodes COML are coupled to the drive-electrode driver 14 via the drive signal switch 140 and are supplied with drive signals Vcom by the drive-electrode driver 14. That is, in this example, the sub-pixels SPix that belong to the same column share one of the drive electrodes COML.

The gate driver 12 illustrated in FIG. 1 applies the scanning signals Vscan to the gates of the TFT elements Tr of the respective sub-pixels SPix through the scanning signal lines GCL illustrated in FIG. 4, thereby sequentially selecting, one by one, rows (horizontal lines) of the sub-pixels SPix arranged in a matrix (row-column configuration) on the display panel 20. The source driver 13 illustrated in FIG. 1 supplies the pixel signals Vpix, via the pixel signal lines SGL illustrated in FIG. 4, to the sub-pixels SPix in the respective horizontal lines sequentially selected one by one by the gate driver 12. Display corresponding to one of the horizontal lines of the sub-pixels SPix is displayed at a time in accordance with the pixel signals Vpix.

As illustrated in FIG. 3, the backlight 8 includes prism sheets 81A and 81B, a diffusion sheet 82, a light guide plate 83, and a light source 84. The light source 84 has, for example, a plurality of light sources (for example, light-emitting diodes (LEDs)) arranged along one direction and in positions facing a lateral side (an entrance face E herein) of the light guide plate 83. The backlight 8 has a structure obtained by stacking, in order, the prism sheets 81A and 81B, the diffusion sheet 82, and the light guide plate 83. The backlight 8 is disposed facing the back side of the display portion 10, that is, one side thereof having the pixel substrate 2, and illuminates the display region 100 from the back side of the display portion 10.

The antenna substrate 5 is disposed facing the back side of the light guide plate 83 of the backlight 8, that is, a side thereof opposite to a side thereof facing the display portion 10. The antenna substrate 5 includes a third substrate 51, the antenna electrode 50, and a dummy electrode 54 (described later). The antenna electrode 50 is disposed in a surfacing layer on a side of the third substrate 51, the side facing the display portion 10. Similarly to the antenna electrode 50, the dummy electrode 54 is disposed in the surfacing layer on the side of the third substrate 51, the side facing the display portion 10. A flexible substrate 73 is coupled to the third substrate 51. An antenna drive-use IC 17 is mounted on the flexible substrate 73. The antenna drive-use IC 17 has the antenna driver 52, illustrated in FIG. 1, implemented therein. The antenna electrode switch 53 illustrated in FIG. 1 may be implemented in the antenna drive-use IC 17 or may be implemented in an IC different from the antenna drive-use IC 17. The third substrate 51 may be made of a glass substrate as in the cases of the first substrate 21 and the second substrate 31.

As illustrated in FIG. 3, the display device 1 according to this embodiment has the second substrate 31 and the first substrate 21 disposed a certain distance apart from each other with the resin frame 91 interposed therebetween. The display device 1 according to this embodiment also has the first substrate 21 and the third substrate 51 disposed a certain distance apart from each other with another resin frame 91 interposed therebetween. These substrates are covered with a front frame 92 and a rear frame 93, the front frame 92 being made of metal and having an opening corresponding to the display region 100, and the rear frame 93 being made of metal. The magnetic-material sheet 90 is provided on the bottom of the rear frame 93. The display device 1 is structured as described above.

The plurality of drive electrodes COML are provided on the first substrate 21 in the display region 100. As illustrated in FIG. 5, the plurality of drive electrodes COML are arranged in a first direction X parallel to the short sides of the display region 100 and each extend in a second direction Y parallel to the long sides of the display region 100. For example, the drive electrodes COML is made of a light-transmissive conductive material such as indium tin oxide (ITO).

The plurality of detection electrodes TDL are provided on the second substrate 31 in the display region 100. As illustrated in FIG. 5, the plurality of detection electrodes TDL are arranged in the second direction Y parallel to the long sides of the display region 100 and each extend in the first direction X parallel to the short sides of the display region 100.

While the first direction X and the second direction Y are perpendicular to each other in this embodiment, these directions need only to intersect each other and any directions intersecting each other, such as those substantially perpendicular to each other, may be employed. As used herein, a view of the display region 100 from a direction perpendicular to (the normal direction of) an X-Y plane formed by the first direction X and the second direction Y is referred to as a plan view. That is, the example illustrated in FIG. 6 represents a plan view of the positional relation between the drive electrodes COML and the detection electrodes TDL, which is a view thereof from the normal direction of the X-Y plane.

Figure 6:
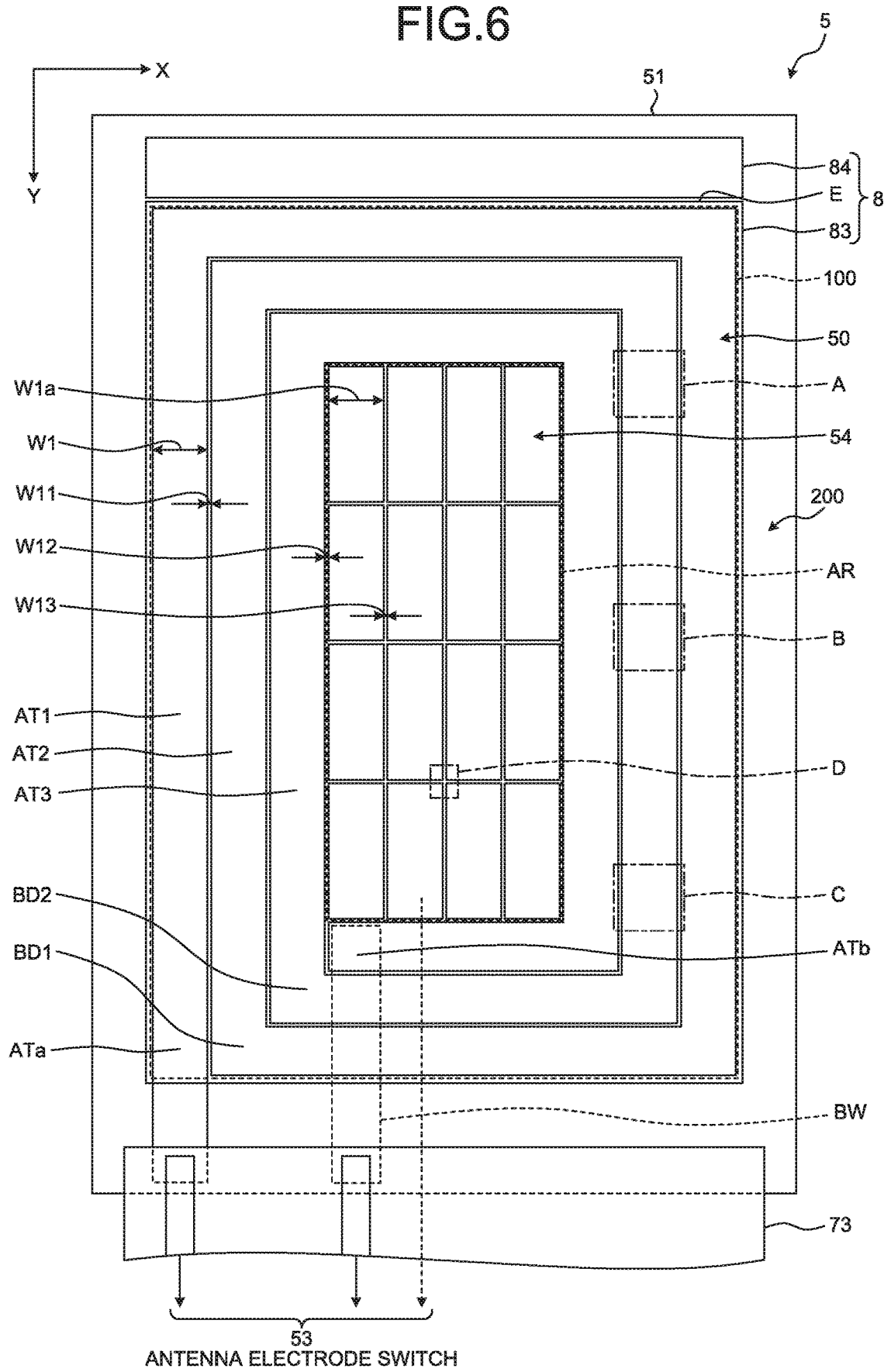
FIG. 6 illustrates an exemplary configuration of an antenna electrode on an antenna substrate of the display device according to the embodiment.

FIG. 6 illustrates an exemplary configuration of an antenna electrode on an antenna substrate of the display device according to the embodiment. The example illustrated in FIG. 6 represents a plan view of the antenna substrate 5, which is a view thereof from the normal direction of the X-Y plane.

Regarding the antenna electrode 50, the arrangement thereof in a plan view is described first. The antenna electrode 50 formed in a belt-like shape is provided in the surfacing layer on the third substrate 51. The antenna electrode 50 has an outer peripheral end ATa and an inner peripheral end ATb on the third substrate 51 in the display region 100. The antenna electrode 50 is formed wound around in a continuous spiral (in a coiled fashion) on the third substrate 51 in the display region 100. The outer peripheral end ATa of the antenna electrode 50 extends into a non-display region 200 located outside of the display region 100 and is coupled to a flexible substrate 73 provided on this third substrate 51 in the non-display region 200.

In the example illustrated in FIG. 6, the antenna electrode 50 is formed wound around about three turns in a spiral on the third substrate 51. The antenna electrode 50 has three sections corresponding to the respective turns, the three sections being a first wound section AT1, a second wound section AT2, and a third wound section AT3. When the display region 100 is viewed in a plan view, the second wound section AT2 is positioned inside the first wound section AT1, and the third wound section AT3 is positioned inside the second wound section AT2. That is, the first wound section AT1, the second wound section AT2, and the third wound section AT3 correspond to parts of the antenna electrode 50 from the outer peripheral end ATa to a bend BD1, from the bend BD1 to a bend BD2, and from the bend BD2 to the inner peripheral end ATb, respectively.

The inner peripheral end ATb of the antenna electrode 50 is led out of the antenna electrode 50 via a bridge wire BW straddling the first wound section AT1 and the second wound section AT2 and is coupled to the flexible substrate 73 provided on the third substrate 51 in the non-display region 200, the bridge wire BW being provided in a layer other than the surfacing layer on the third substrate 51. The antenna electrode 50 is extended further on the flexible substrate 73 and electrically coupled to the antenna electrode switch 53 illustrated in FIG. 1. With a first layer denoting a layer in which the first wound section AT1 and the second wound section AT2 are provided, the bridge wire BW straddling the first wound section AT1 and the second wound section AT2 may be provided in: a higher layer than the first layer, that is, a layer facing a first side of the first layer, the first side facing the display portion 10. The bridge wire BW may be in a lower layer than the first layer, that is, a layer facing a second side of the first layer, the second side being opposite to the first side of the first layer.

The first wound section AT1, the second wound section AT2, and the third wound section AT3 are all provided in the surfacing layer on the third substrate 51 within the display region 100 in a plan view. The first wound section AT1, the second wound section AT2, and the third wound section AT3 have widths equally sized as a width W1, which is substantially uniform within the display region 100 in a plan view. The width W1 of each of these first wound section AT1, second wound section AT2, and third wound section AT3 is about two to several millimeters.

The first wound section AT1, the second wound section AT2, and the third wound section AT3 are wound with a gap W11 between adjacent parts thereof within the display region 100 in a plan view. The first wound section AT1 and the second wound section AT2 are coupled to each other at the bend BD1 of the antenna electrode 50, and the second wound section AT2 and the third wound section AT3 are coupled to each other at the bend BD2 of the antenna electrode 50. Preferably, the gap W11 between adjacent parts of these first wound section AT1, the second wound section AT2, and the third wound section AT3 is set smaller than the width W1 of the first wound section AT1, the second wound section AT2, and the third wound section AT3 to the extent possible (W11<<W1) and is set to, for example, several micrometers to several tens of micrometers.

In the surfacing layer on the third substrate 51 according to this embodiment, a plurality of dummy electrodes 54 are provided in a region AR within the display region 100 in a plan view, the region AR being unoccupied by the antenna electrode 50. The dummy electrodes 54 are disposed on the same plane as the antenna electrode 50, and are spaced apart from the antenna electrode 50. These dummy electrodes 54 are, as described later, electrically coupled to one another via ultra-thin wires, and are electrically coupled to the antenna electrode switch 53 illustrated in FIG. 1 on the flexible substrate 73.

A path via which the dummy electrodes 54 in the region AR are coupled to the antenna electrode switch 53 may be extended to the outside of the display region 100 through a layer other than the surfacing layer on the third substrate 51, or may be extended to the outside of the display region 100 through the surfacing layer on the third substrate 51 along the gap W11 between adjacent parts of the first wound section AT1, the second wound section AT2, and the third wound section AT3, for example. While the dummy electrodes 54 are provided in the region AR enclosed by the antenna electrode 50 within the display region 100 in the example illustrated in FIG. 6, another configuration may be employed. For example, if the display region 100 includes an outer region surrounding the antenna electrode 50 and unoccupied by the antenna electrode 50, at least one such dummy electrode 54 may be provided in the outer region.

As with the first wound section AT1, the second wound section AT2, and the third wound section AT3, all of the dummy electrodes 54 are provided in the surfacing layer on the third substrate 51 within the display region 100 in a plan view, thereby being positioned on the same plane as the first wound section AT1, the second wound section AT2, and the third wound section AT3. As with the first wound section AT1, the second wound section AT2, and the third wound section AT3, within the display region 100 in a plan view, each of the dummy electrodes 54 has a substantially uniform width W1a that is two to several millimeters and that is substantially equally to the width W1 of the first wound section AT1, the second wound section AT2, and the third wound section AT3 (W1a≈W1).

Within the display region 100 in a plan view, each of the dummy electrodes 54 and the antenna electrode 50 are disposed without intersecting each other while the dummy electrodes 54 disposed along the outer edge of the region AR are spaced apart from the antenna electrode 50 with a gap W12 therebetween. In a plan view, adjacent ones of the dummy electrodes 54 are disposed without intersecting each other while being spaced apart from each other with a gap W13 therebetween. Preferably, the gap W12 between the dummy electrodes 54 and the antenna electrode 50 and the gap W13 between the adjacent dummy electrodes 54 are sized substantially equally to the gap W11 between adjacent parts of the first wound section AT1, the second wound section AT2, and the third wound section AT3 (W12≈W11 and W13≈W11).

Above the upper side of the third substrate 51, the light guide plate 83 of the backlight 8 is disposed so as to cover the display region 100. The light source 84 is disposed facing the entrance face E of the light guide plate 83.

In this embodiment, the antenna electrode 50 is formed of, for example, a reflective conductive material, more specifically, a metal material such as gold, silver, copper, aluminum, or nickel. The dummy electrodes 54 are formed of the same material as the antenna electrode 50. That is, within the display region 100, the antenna electrode 50 and the dummy electrodes 54 are formed of conductive materials having the same reflectivity. Thus, the antenna electrode 50 and the dummy electrodes 54 function as a reflective plate that reflects light having entered the light guide plate 83 from the light source 84 and emits light toward the display region 100 in the display portion 10. In this embodiment, the gap W11 between adjacent parts of the first wound section AT1, the second wound section AT2, and the third wound section AT3, the gap W12 between the dummy electrodes 54 and the antenna electrode 50, and the gap W13 between adjacent ones of the dummy electrodes 54 are each sized smaller (for example, several micrometers to several tens of micrometers) than the width W1 of the first wound section AT1, the second wound section AT2, and the third wound section AT3, and the width W1a of each of the dummy electrodes (for example, about two to several millimeters). Consequently, the gap W11 between adjacent parts of the first wound section AT1, the second wound section AT2, and the third wound section AT3, the gap W12 between the above dummy electrodes 54 and the antenna electrode 50, and the gap W13 between adjacent ones of the dummy electrodes 54 can be kept from being viewed within the display region 100.

Figure 7:
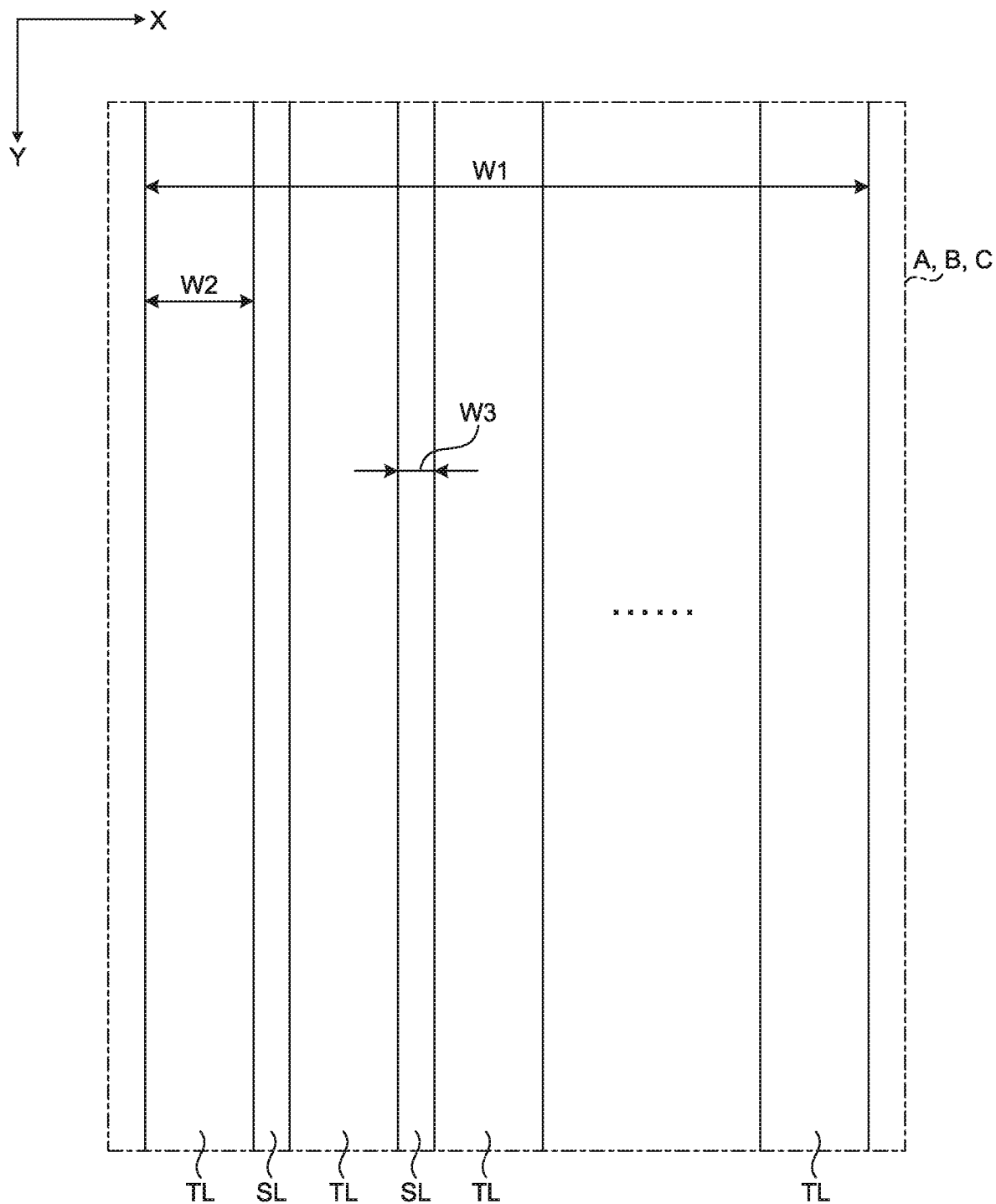
FIG. 7 is an exemplary enlarged view of a region A, B, or C illustrated in FIG. 6.

FIG. 7 is an exemplary enlarged view of a region A, B, or C illustrated in FIG. 6. In the example illustrated in FIG. 7, a plurality of slits SL are provided in the antenna electrode 50. That is, in the example illustrated in FIG. 7, the antenna electrode 50 has a plurality of thin-wire portions TL each spaced apart from the adjacent thin-wire portion TL with the corresponding slit SL therebetween.

As described above, the width W1 of the antenna electrode 50 is, for example, about 2 to several millimeters. The width W2 of each of the thin-wire portions TL is, for example, within the range of the width of one unit pixel to the width of two unit pixels. In one example, the width W2 of the thin-wire portion TL is, for example, about 140 to 280 micrometers. Preferably, the width W3 of each of the slits SL is sized substantially equally to the gap W11 between adjacent parts of the first wound section AT1, the second wound section AT2, and the third wound section AT3, the gap W12 between the dummy electrodes 54 and the antenna electrode 50, and the gap W13 between adjacent ones of the dummy electrodes 54, all of which are illustrated in FIG. 6.

FIG. 8 is an exemplary enlarged view of a region D illustrated in FIG. 6. In the example illustrated in FIG. 8, a plurality of slits SLa are provided in the dummy electrodes 54 as in the antenna electrode 50. That is, in the example illustrated in FIG. 8, the dummy electrode 54 has a plurality of thin-wire portions TLa each spaced apart from the adjacent thin-wire portion TLa with the corresponding slit SLa therebetween. In the example illustrated in FIG. 8, each of the dummy electrodes 54 has a plurality of thin-piece portions 54a, and these thin-piece portions 54a are electrically coupled to one another by ultra-thin wires 55. As indicated by the broken-line arrows in FIG. 6 and FIG. 8, these ultra-thin wires 55 are led out, through the surfacing layer on the third substrate 51 or a layer other than the surfacing layer, to an outer part surrounding the antenna electrode 50, and are electrically coupled to the antenna electrode switch 53 illustrated in FIG. 1.

Preferably, the width W1a of each of the dummy electrodes 54, the width W2a of each of the thin-wire portions TLa, and the width W3a of each of the slits SLa are sized substantially equally to the width W1 of the antenna electrode 50, the width W2 of each of the thin-wire portions TL, and the width W3 of each of the slits SL, respectively.

Thus, the slits SL are provided in the antenna electrode 50, the slits SLa are provided in the dummy electrodes 54. The gap W11 between adjacent parts of the first wound section AT1, the second wound section AT2, and the third wound section AT3, the gap W12 between the dummy electrodes 54 and the antenna electrode 50, the gap W13 between adjacent ones of the dummy electrodes 54, the width W3 of the slit SL, and the width W3a of the slit SLa are sized substantially equally. Consequently, the antenna electrode 50 and the dummy electrodes 54 can be disposed covering the display region 100 with a uniform density across the display region 100. Thus, the reflectivity per unit area can be made substantially uniform across the display region 100.

Figure 9A:
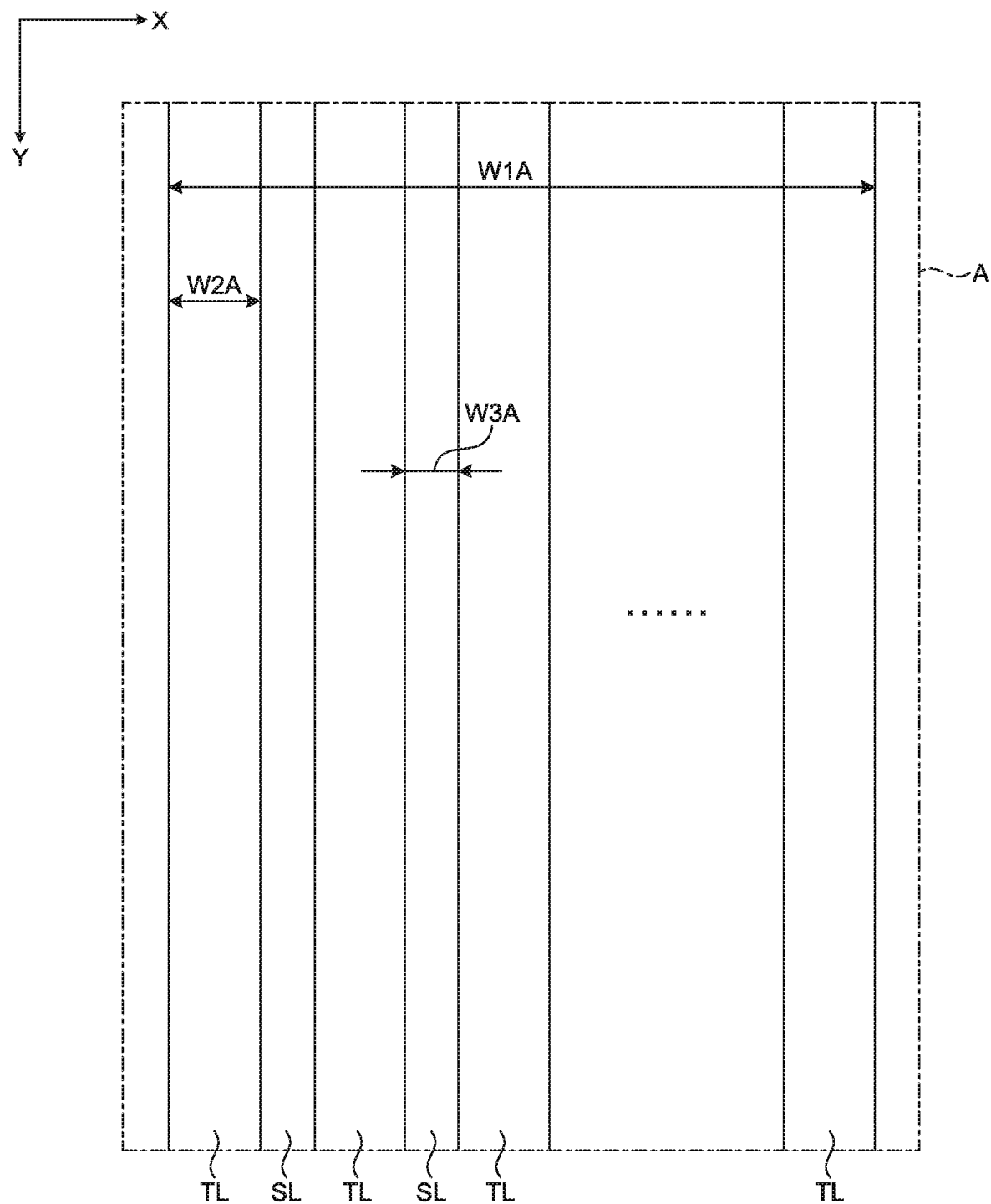
FIG. 9A is an exemplary enlarged view, which is different from FIG. 7, of the region A illustrated in FIG. 6.
Figure 9B:
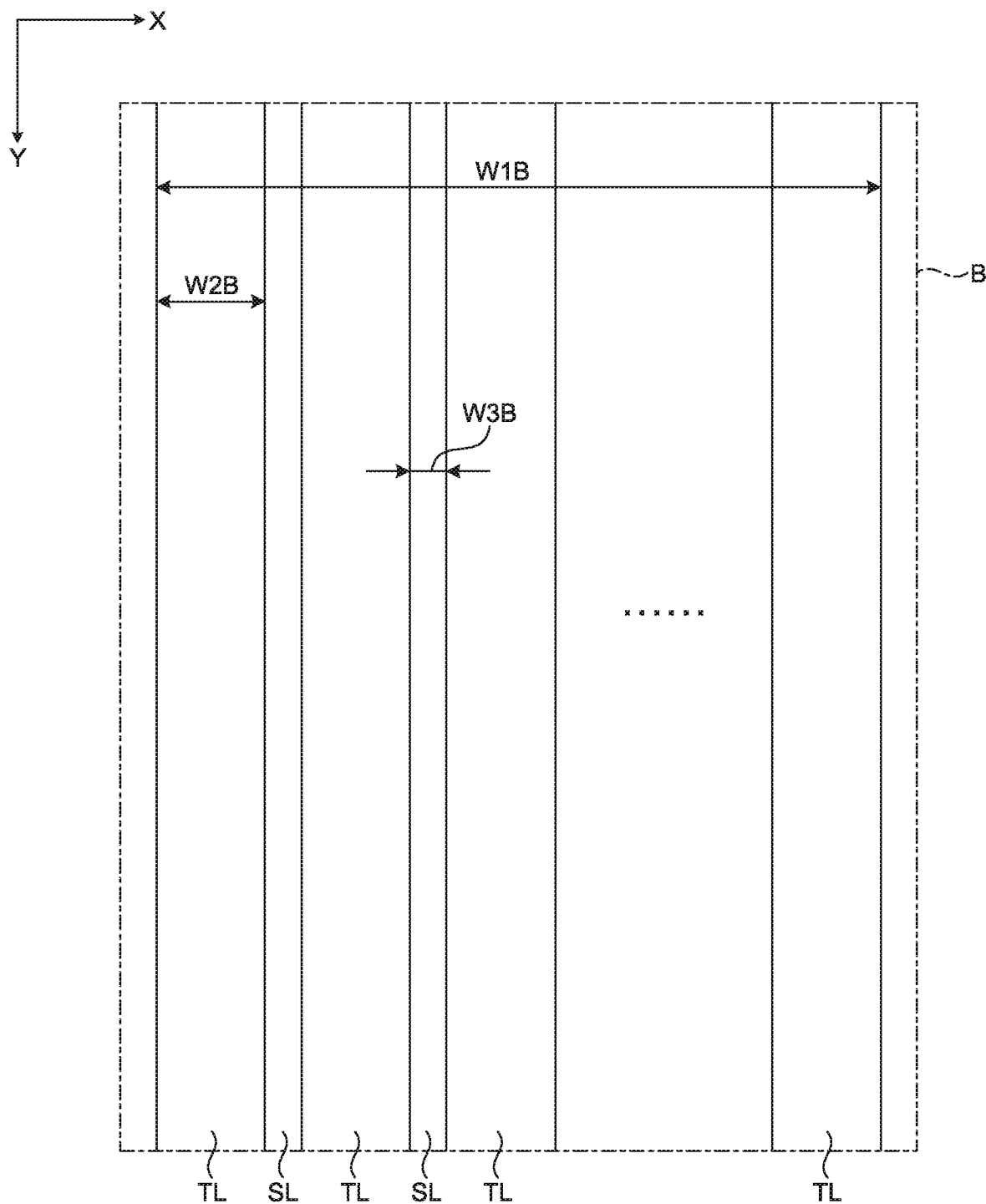
FIG. 9B is an exemplary enlarged view, which is different from FIG. 7, of the region B illustrated in FIG. 6.
Figure 11:
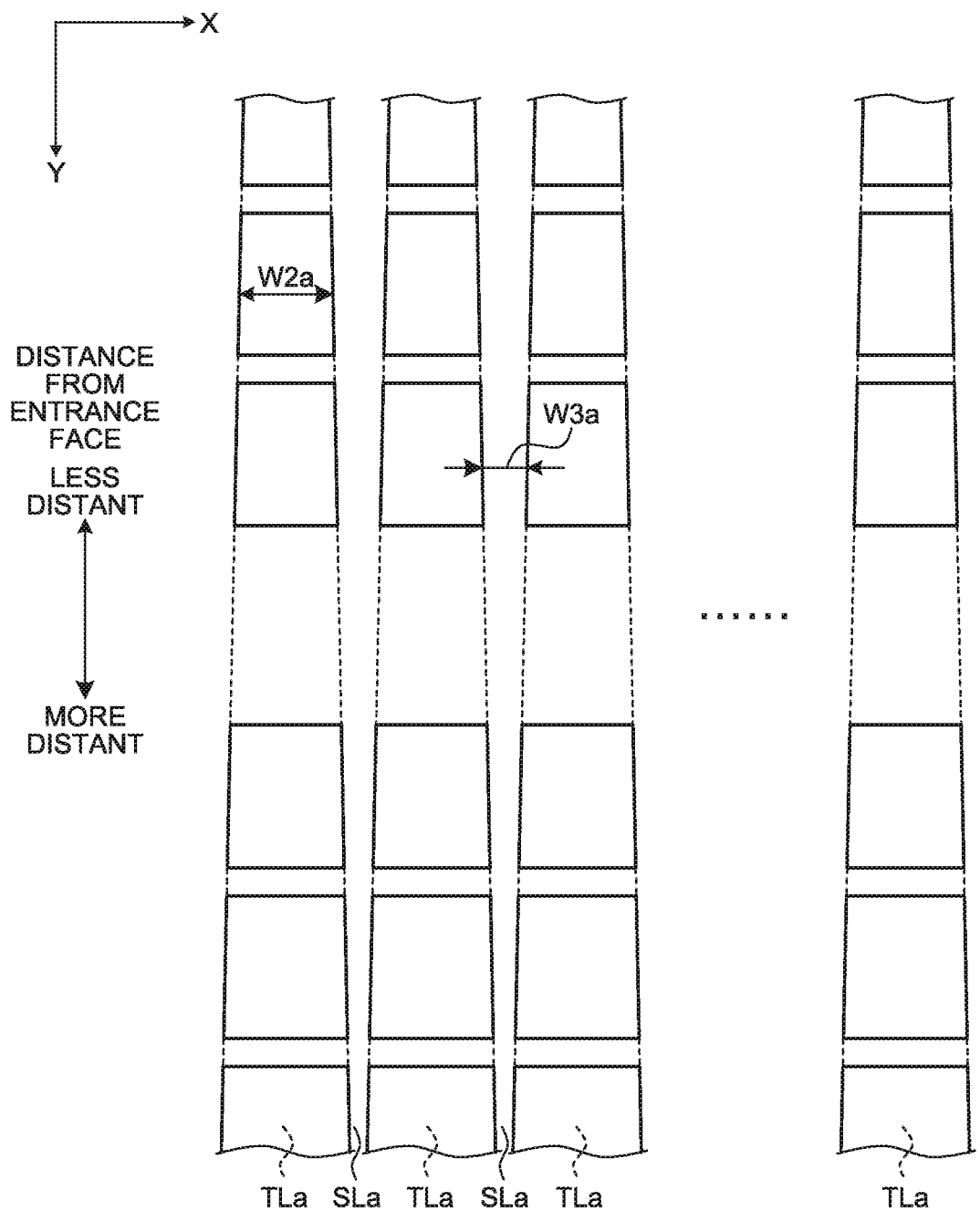
FIG. 11 is a schematic diagram illustrating exemplary change in width of each thin-wire portion and each slit of a dummy electrode in the Y direction.

FIG. 9A is an exemplary enlarged view, which is different from FIG. 7, of the region A illustrated in FIG. 6. FIG. 9B is an exemplary enlarged view, which is different from FIG. 7, of the region B illustrated in FIG. 6. FIG. 9C is an exemplary enlarged view, which is different from FIG. 7, of the region C illustrated in FIG. 6. FIG. 10 is a schematic diagram illustrating exemplary change in width of each thin-wire portion and each slit of the antenna electrode in the Y direction. FIG. 11 is a schematic diagram illustrating exemplary change in width of each thin-wire portion and each slit of the dummy electrode in the Y direction.

As illustrated in FIG. 10, in the antenna electrode 50, the width W3 of each of the slits SL is narrower, and the width W2 of each of the thin-wire portions TL is wider, in a part more distant from the entrance face E of the light guide plate 83 facing the light source 84, that is, in a part more distant from the light source 84. Specifically, for example, the width W3B of the slit SL in the region B illustrated in FIG. 9B is narrower than the width W3A of the slit SL in the region A illustrated in FIG. 9A, and the width W3C of the slit SL in the region C illustrated in FIG. 9C is narrower than the width W3B in the region B illustrated in FIG. 9B (W3A>W3B>W3C). Accordingly, the width W2B of the thin-wire portion TL in the region B illustrated in FIG. 9B is wider than the width W2A of the thin-wire portion TL in the region A illustrated in FIG. 9A, and the width W2C of the thin-wire portion TL in the region C illustrated in FIG. 9C is wider than the width W2B of the thin-wire portion TL in the region B illustrated in FIG. 9B (W2A<W2B<W2C).

As illustrated in FIG. 11, in the same manner as the antenna electrode 50, the dummy electrodes 54 has the width W3a of each of the slits SLa narrower and the width W2a of each of the thin-wire portions TLa wider in a part thereof more distant from the entrance face E of the light guide plate 83 facing the light source 84 (from the light source 84).

As illustrated in FIG. 3 and FIG. 6, the light source 84 is provided in a position facing a lateral side (the entrance face E herein) of the light guide plate 83. In such a configuration, the quantity of light that reaches a certain position from the light source 84 is smaller as the certain position is more distant from the entrance face E facing the light source 84 (from the light source 84). As described above, the respective widths of each of the slits SL and each of the slits SLa are narrower, and the width W3 of each of the thin-wire portions TL in the antenna electrode 50 and the width W3a of each of the thin-wire portions TLa in the dummy electrodes 54 are wider, in parts more distant from the entrance face E of the light guide plate 83 facing the light source 84 (from the light source 84). The quantity of light emitted to the display region 100 of the display portion 10 is thus made uniform, and the brightness of the display region 100 can be consequently made uniform within the display region 100.

Figure 12:
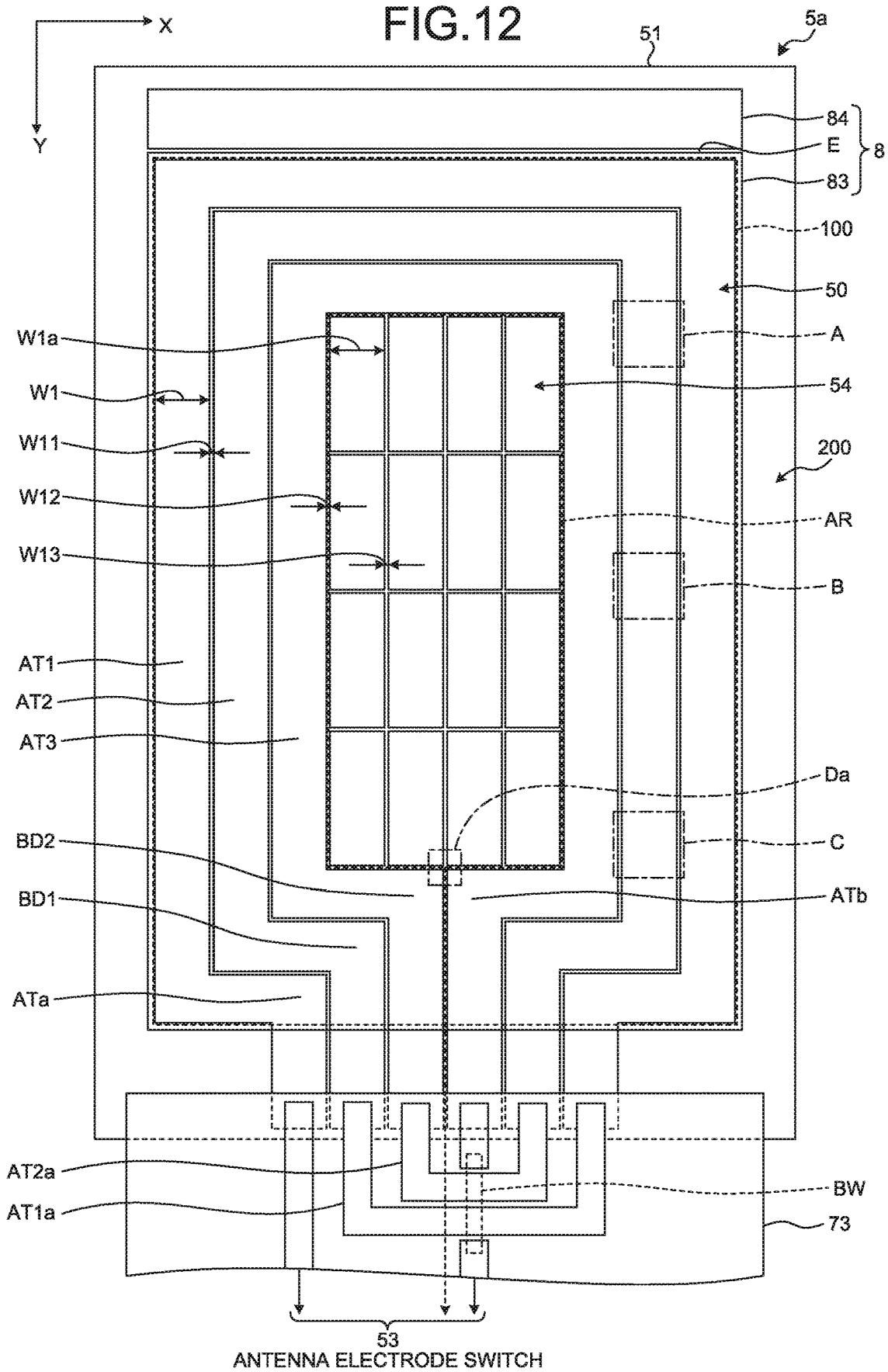
FIG. 12 illustrates a modification of an antenna electrode on an antenna substrate of the display device according to the embodiment.

FIG. 12 illustrates a modification of the antenna electrode on the antenna substrate of the display device according to the embodiment. The example illustrated in FIG. 12 is represented in a plan view of an antenna substrate 5a, which is a view thereof from the normal direction of the X-Y plane.

Figure 13:
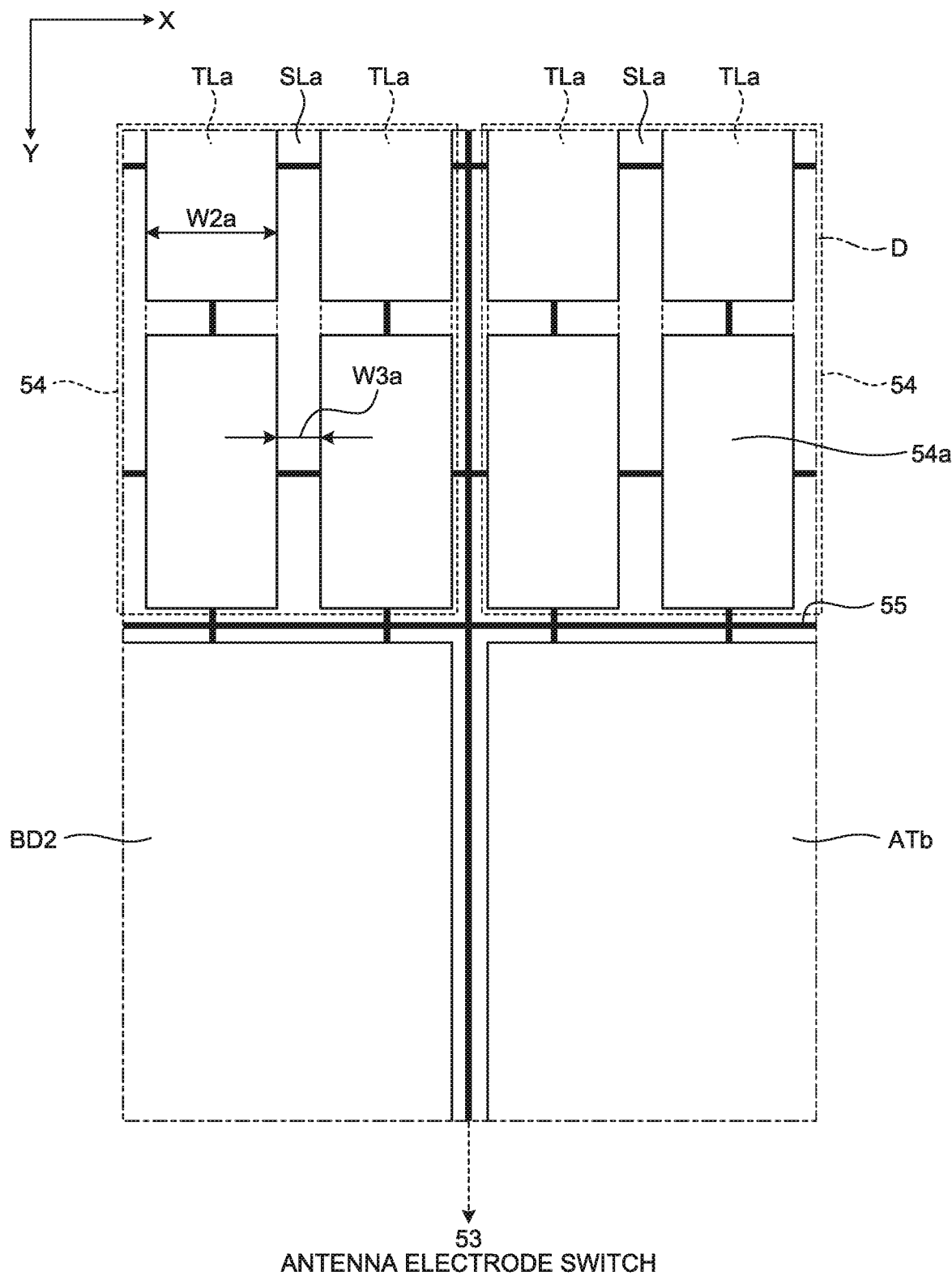
FIG. 13 is an exemplary enlarged view of a region Da illustrated in FIG. 12.

FIG. 13 is an exemplary enlarged view of a region Da illustrated in FIG. 12. In the example illustrated in FIG. 13, the ultra-thin wire 55 is extended between the bend BD2 and the inner peripheral end ATb of the antenna electrode 50, and is led out through the surfacing layer on the third substrate 51 to an outer part surrounding the antenna electrodes 50.

In the modification illustrated in FIG. 12, a first wound wire AT1a, which is a part of the first wound section AT1, runs through a route on the flexible substrate 73. A second wound wire AT2a, which is a part of the second wound section AT2, also runs through a route on the flexible substrate 73. The inner peripheral end ATb of the antenna electrode 50 is led out of the antenna electrode 50 via the bridge wire BW straddling the first wound wire AT1a and the second wound wire AT2a. That is, for the modification illustrated in FIG. 12, the bridge wire BW can be provided outside the display region 100. The other configurations are the same as those illustrated in FIG. 6. With a second layer denoting a layer in which the first wound wire AT1a and the second wound wire AT2a are provided, the bridge wire BW straddling the first wound wire AT1a and the second wound wire AT2a may be provided in: a higher layer than the second layer, that is, a layer facing a first side of the second layer, the first side facing the display portion 10. The bridge wire BW may be in a lower layer than the second layer, that is, a layer facing a second side of the second layer, the second side being opposite to the first side of the second layer.

The configuration illustrated in FIG. 6 has the bridge wire BW provided in a layer other than the surfacing layer on the third substrate 51. Therefore, a part having this bridge wire BW in the display region 100 on the third substrate 51 may have a reflectivity different from that of the other part in the display region 100 on the third substrate 51. The configuration illustrated in FIG. 12 has the bridge wire BW provided on the flexible substrate 73, thereby making it possible to avoid having parts different in reflectivity within the display region 100.

The configuration illustrated in FIG. 12 allows only the surfacing layer on the third substrate 51 to have the antenna electrode 50 and the dummy electrodes 54, thereby forming the third substrate 51 of a single-layered substrate, which contributes to cost reduction.

The example illustrated in FIG. 12 illustrates a configuration in which parts of the first wound section AT1 and the second wound section AT2 run through routes on the flexible substrate 73, and in which the bridge wire BW intersected by the antenna electrode 50 is provided on the flexible substrate 73. However, another configuration may be employed such that: no parts of the first wound section AT1 and the second wound section AT2 run through routes on the flexible substrate 73; and the bridge wire BW intersecting the antenna electrode 50 is provided on the third substrate 51 within the non-display region 200. This configuration also makes it possible to avoid having non-uniform reflectivity within the display region 100.

The configurations of the antenna electrode 50 and the dummy electrodes 54 are not limited to the illustrated examples. Various exemplary configurations adoptable as the shape of the antenna electrode 50 include, but are not limited to, a circular shape, a rectangular shape, and a polygonal shape. While the antenna electrode 50 is formed wound around about three turns in a spiral in the illustrated examples, the number of turns of the antenna electrode 50 is not limited. The antenna electrode 50 may be wound one turn, or four or more turns.

Figure 14A:
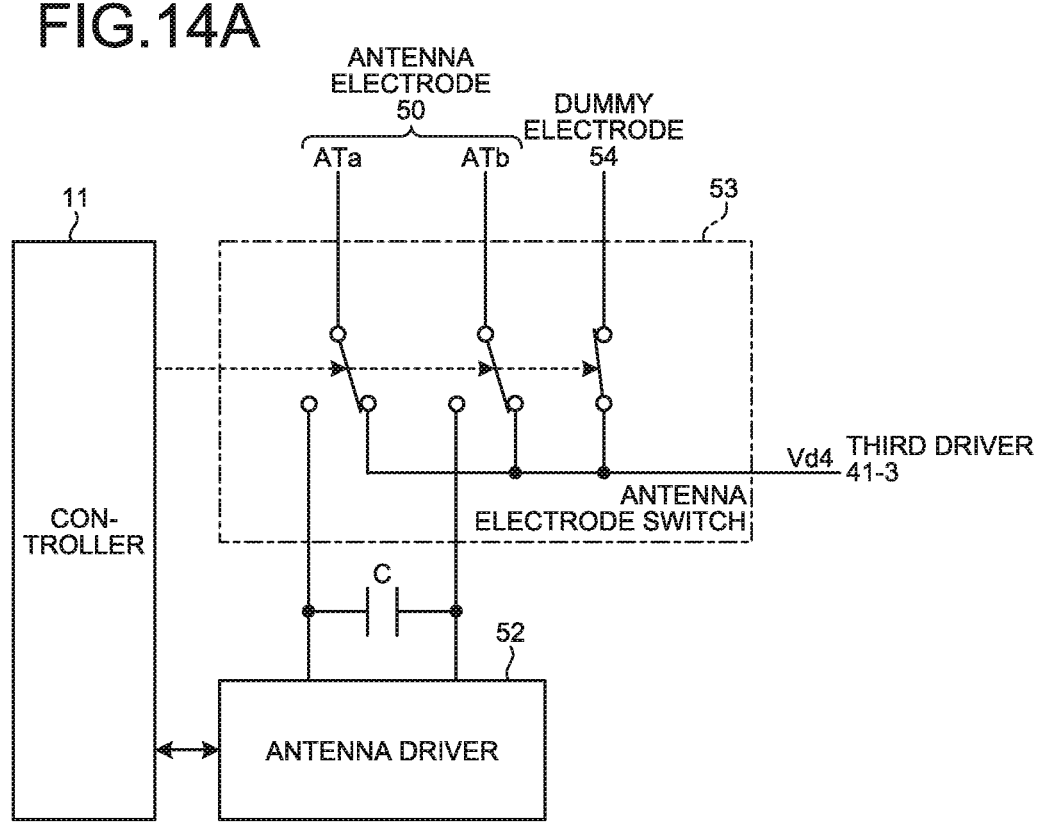
FIG. 14A illustrates an example of the operation of an antenna electrode switch in an exemplary configuration thereof in the display device according to the embodiment.
Figure 14B:
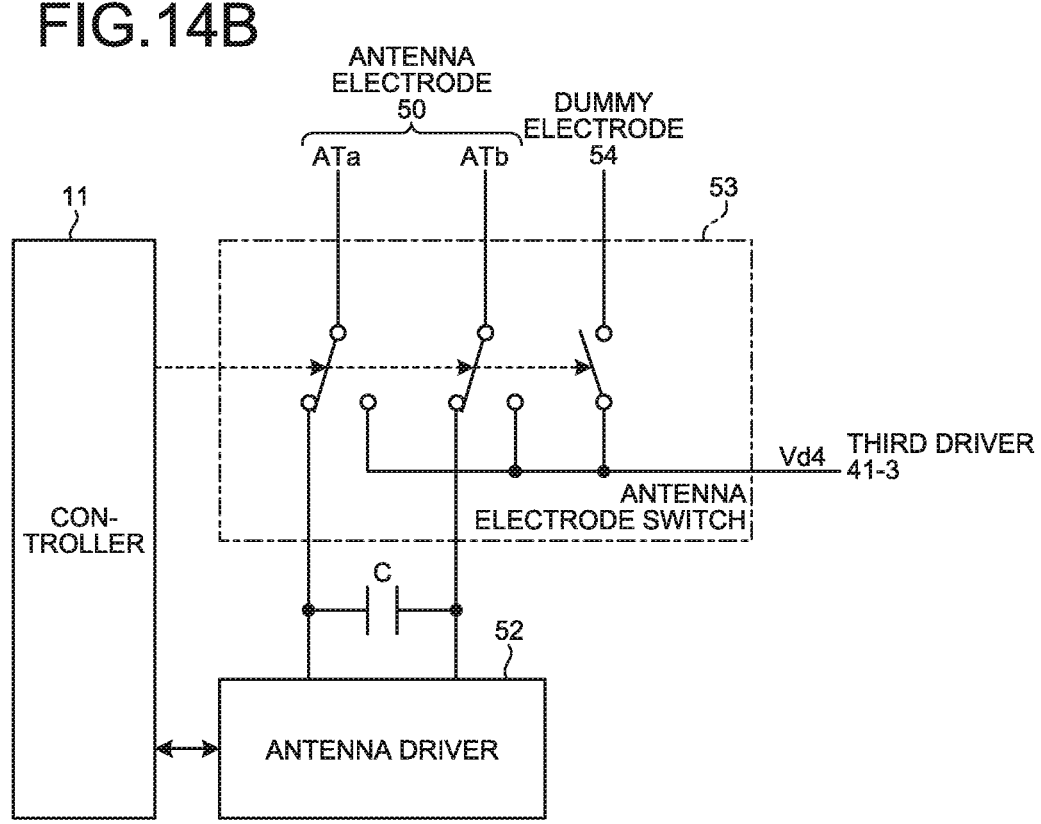
FIG. 14B illustrates another example of the operation, different from the example in FIG. 14A, of an antenna electrode switch in the exemplary configuration thereof in the display device according to the embodiment.

FIG. 14A illustrates an example of the operation of the antenna electrode switch in an exemplary configuration thereof in the display device according to the embodiment. FIG. 14B illustrates another example, different from the example in FIG. 14A, of the operation of the antenna electrode switch in the exemplary configuration thereof in the display device according to the embodiment. The example illustrated in FIG. 14A represents a state in which the above-described first force detection process or second force detection process is being performed. The example illustrated in FIG. 14B represents a state in which NFC-based short-range wireless communication is being performed based on the short-range wireless communication command output from the external host IC (not illustrated). As illustrated in FIG. 14A and FIG. 14B, a capacitor C for resonance frequency adjustment may be provided between two terminals of the antenna driver 52, which are coupled to the outer peripheral end ATa and the inner peripheral end ATb of the antenna electrode 50.

During regular operation, that is, while not performing NFC-based short-range wireless communication, the display device 1 according to this embodiment carries out, the image display process, the touch-position detection process, and the force detection process by switching between the display periods in which to perform the image display process on the display panel 20, the touch-position detection periods in which to perform the touch-position detection process, and the force detection periods in which to perform the force detection process, as described above.

During the force detection period, the controller 11 controls the antenna electrode switch 53 as illustrated in FIG. 14A so that the antenna electrode 50 and the dummy electrodes 54 can be coupled to the third driver 41-3. Consequently, the antenna electrode 50 and the dummy electrodes 54 receive the fourth drive signals Vd4 supplied from the third driver 41-3, so that the above-described first force detection process or second force detection process is performed.

Figure 15:
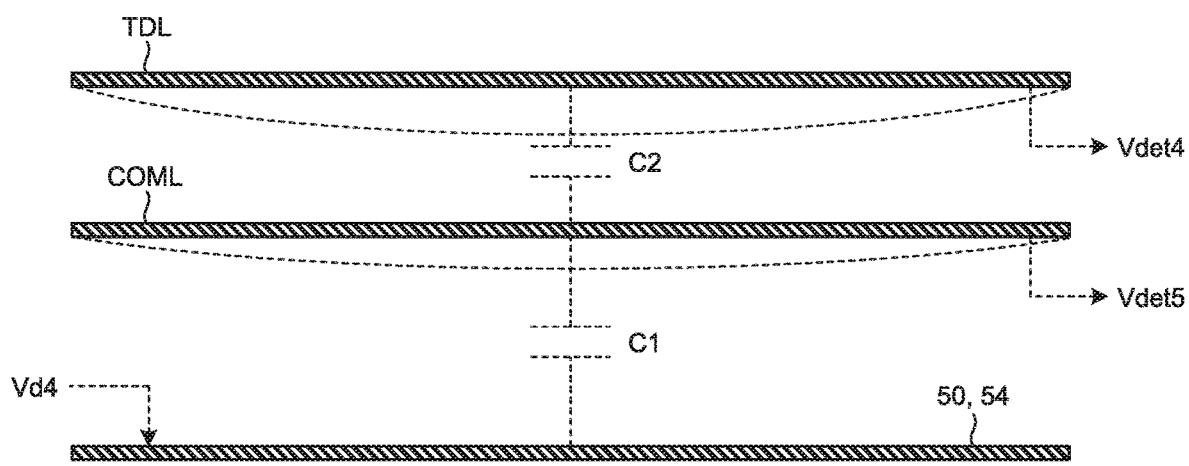
FIG. 15 is an explanatory diagram for explaining a first force detection process and a second force detection process in the display device according to the embodiment.

The first force detection process and the second force detection process are described here. FIG. 15 is an explanatory diagram for explaining the first force detection process and the second force detection process in the display device according to the embodiment.

As described above, the display device 1 according to this embodiment has the second substrate 31 and the first substrate 21 disposed a certain distance apart from each other with the resin frame 91 interposed therebetween. The display device 1 according to this embodiment also has the first substrate 21 and the third substrate 51 disposed a certain distance apart from each other with another resin frame 91 interposed therebetween. The second substrate 31 has the detection electrodes TDL provided thereon. The first substrate 21 has the drive electrodes COML provided thereon. The third substrate 51 has the antenna electrode 50 and the dummy electrodes 54 provided thereon (see FIG. 3). In this configuration, a capacitance C1 is generated between the drive electrode COML and each of the antenna electrode 50 and the dummy electrode 54, and a capacitance C2 is generated between the detection electrode TDL and the drive electrode COML (see FIG. 15).

In the above-described configuration, a space 80 is formed between the display portion 10 and the backlight 8, and the periphery of the display portion 10 is supported by the resin frame 91 in this state. Consequently, force applied to this display portion 10 causes the display portion 10 to warp and further causes the drive electrode COML to warp accordingly (FIG. 15). As a result, the distance (interval) d2 (FIG. 3) between the drive electrode COML and the corresponding one or more of the antenna electrode 50 and the dummy electrodes 54 changes, and the capacitance C1 (FIG. 15) between the drive electrode COML and the corresponding one or more of the antenna electrode 50 and the dummy electrodes 54 changes accordingly. Furthermore, as a result of pressing of the display portion 10, the liquid crystal layer 6 provided between the pixel substrate 2 and the counter substrate 3 causes the counter substrate 3 to warp, and further causes the corresponding detection electrode TDL to warp accordingly (FIG. 15). As a result, the distance (interval) d1 (FIG. 3) between the detection electrode TDL and the corresponding one or more of the antenna electrode 50 and the dummy electrodes 54 changes, and the capacitance C2 (FIG. 15) between the detection electrode TDL and the drive electrode COML changes accordingly.

In the above-described first force detection process, the antenna electrode 50 and the dummy electrodes 54 are used as transmission electrodes for the first force detection process, and the detection electrodes TDL are used as reception electrodes for the first force detection process. That is, force applied to the display portion 10 can be measured in a manner such that: the antenna electrode 50 and the dummy electrodes 54 receive the fourth drive signal Vd4 from the third driver 41-3 of the detector 40; and changes in fourth detection signals Vdet4 are detected. The changes in fourth detection signals Vdet4 change in accordance with a change in a combined capacitance obtained by combining the capacitance C1 and the capacitance C2, the capacitance C1 being a capacitance between the dummy electrode COML and each of the antenna electrode 50 and the drive electrodes 54, and the capacitance C2 being a capacitance between the detection electrode TDL and the drive electrode COML.

In the above-described second force detection process, the antenna electrode 50 and the dummy electrodes 54 are used as transmission electrodes for the second force detection process, and the drive electrodes COML are used as reception electrodes for the second force detection process. That is, force applied to the display portion 10 can be measured in a manner such that: the antenna electrode 50 and the dummy electrodes 54 receive the fourth drive signal Vd4 from the third driver 41-3 of the detector 40; and changes in fifth detection signals Vdet5 are detected. The changes in fourth detection signals Vdet4 change in accordance with a change in the capacitance C2 between the detection electrode TDL and the drive electrode COML.

With reference to FIG. 14B again, for example, when the short-range wireless communication command is input from the external host IC (not illustrated), the controller 11 controls the antenna electrode switch 53 so that the dummy electrodes 54 can be put into a floating state with the antenna electrode 50 being coupled to the antenna driver 52 as illustrated in FIG. 14B. Consequently, the antenna driver 52 drives the antenna electrodes 50, so that an NFC-based short-range communication capability is implemented.

In this embodiment, as described above, during regular operation, that is, while not performing NFC-based short-range wireless communication, the image display process, the touch-position detection process, and the force detection process are implemented with switching between the display periods in which to perform the image display process on the display panel 20, the touch-position detection periods in which to perform the touch-position detection process, and the force detection periods in which to perform the force detection process. Therefore, as described above, the antenna electrode 50 and the dummy electrodes 54 can be used as transmission electrodes for the force detection processes.

Thus using the antenna electrode 50 and the dummy electrodes 54 as transmission electrodes for the force detection processes makes it possible to implement the force detection processes without any other electrodes than the NFC antenna.

While the above-described example illustrates that the display device 1 is a display device including the display portion 10 having a touch detection capability incorporated therein, this embodiment is applicable also to a configuration such that the display portion 10 does not have a touch detection capability incorporated therein. That is, also in a configuration such that the display portion 10 does not have a touch detection capability incorporated therein, the need for any other electrodes than the NFC antenna can be eliminated with the antenna electrodes 50 and the dummy electrodes 54 used as a reflective plate that emits light toward the display region 100 of the display portion 10 by reflecting light that has entered the light guide plate 83 from the light source 84 in a plan view. Consequently, cost for implementing an NFC-based short-range wireless communication capability can be reduced. The display device 1 can be prevented from having a thicker profile, that is, the display device 1 can be equipped with an NFC-based short-range wireless communication capability even if the profile thereof is kept thin.

Modification

Figure 16:
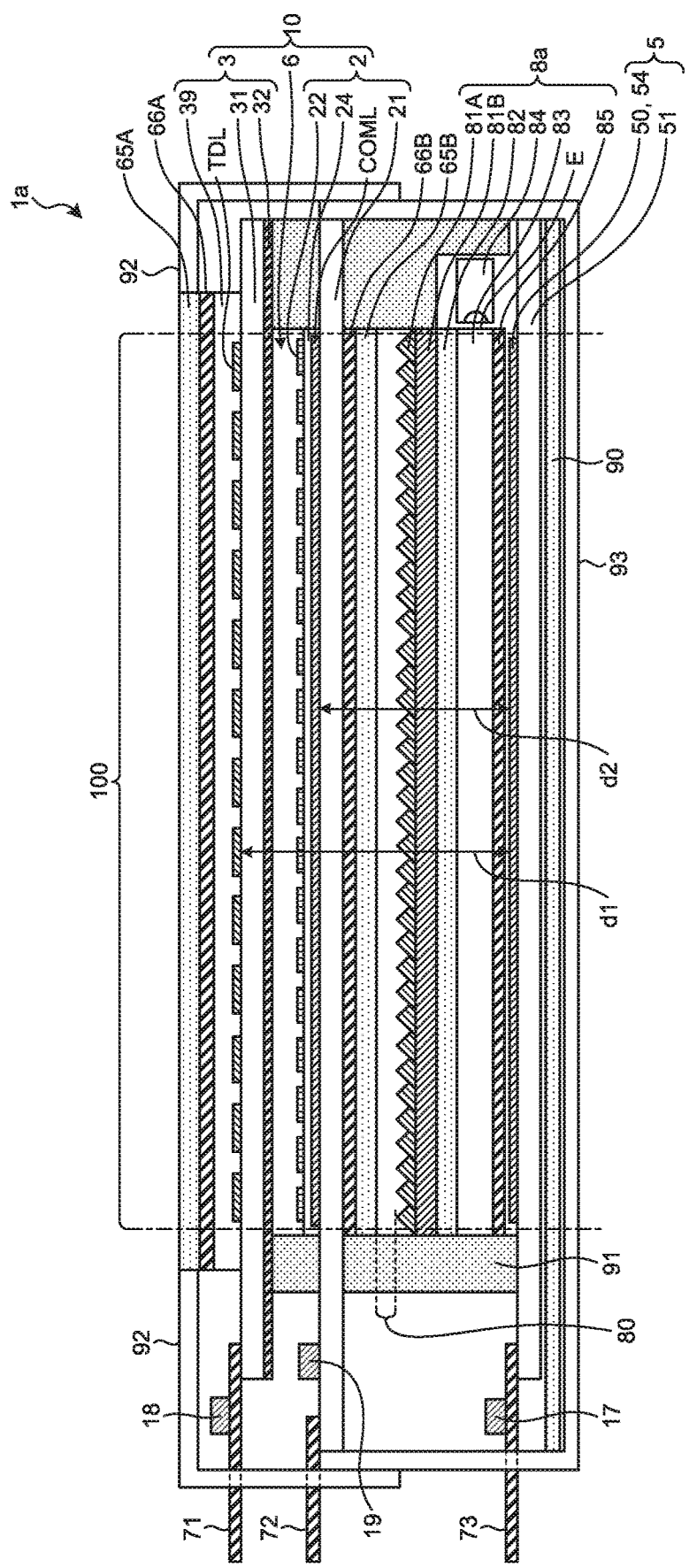
FIG. 16 is a schematic diagram representing a sectional structure of a display device according to a modification of the embodiment.

FIG. 16 is a schematic diagram representing a sectional structure of a display device according to a modification of the embodiment. As illustrated in FIG. 16, a display device 1a in which a backlight 8a includes a reflective sheet 85 provided on the back side of the light guide plate 83 may be adopted. Preferably, the reflective sheet 85 is formed of an electromagnetic-wave transmissive material, which does not block electromagnetic wave transmission for NFC, for example. Also in such a configuration, the antenna electrode 50 and the dummy electrodes 54 are used as transmission electrodes for force detection processes, which makes it possible to implement the force detection processes without providing any other electrodes in addition to the NFC antenna. Consequently, cost for implementing an NFC-based short-range wireless communication capability can be reduced. The display device 1a can be prevented from having a thicker profile, that is, the display device 1a can be equipped with an NFC-based short-range wireless communication capability even if the profile thereof is kept thin.

As described above, the display devices 1 and 1a according to the embodiment include the respective backlights 8 and 8a each including the light guide plate 83 and the light source 84 that is provided facing a lateral side of this light guide plate 83 and emits light, and each being configured to illuminate the display region 100 from the back side of the display portion 10. Each of the display devices 1 and 1a further includes the antenna substrate 5 disposed facing the back side of the light guide plate 83 of a corresponding one of the backlights 8 and 8a, that is, facing a side thereof opposite to a side facing the pixel substrate 2. The antenna electrode 50 having the substantially uniform width W1 and wound around is provided in the surfacing layer on the third substrate 51 included in this antenna substrate 5. The plurality of dummy electrodes 54 are provided within the region AR that is located on the same plane as the antenna electrode 50 and is unoccupied by the antenna electrode 50. Within the display region 100 in a plan view, the antenna electrode 50 and the dummy electrodes 54 are formed of materials having the same reflectivity, thereby constituting a reflective plate that reflects light having entered the light guide plate 83 from the light source 84 and emits light toward the display region 100 of the display portion 10. This configuration makes it possible to implement an NFC-based short-range wireless communication capability without any antenna other than the reflective plate. Consequently, cost for implementing an NFC-based short-range wireless communication capability can be reduced, and the display devices 1 and 1a can be kept from having larger thickness for the capability.

The gap W11 between adjacent parts of the first wound section AT1, the second wound section AT2, and the third wound section AT3 of the antenna electrode 50, the gap W12 between the dummy electrodes 54 and the antenna electrode 50, and the gap W13 between adjacent ones of the dummy electrodes 54 are each sized smaller (for example, about a few micrometers to several tens of micrometers) than the width W1 of the first wound section AT1, the second wound section AT2, and the third wound section AT3, and the width W1a (for example, about two to several millimeters) of each dummy electrode 54. Consequently, the gap W11 between adjacent parts of the first wound section AT1, the second wound section AT2, and the third wound section AT3, the gap W12 between the dummy electrodes 54 and the antenna electrode 50, and the gap W13 between adjacent ones of the dummy electrodes 54 can be kept from being viewed within the display region 100.

The plurality of slits SL are provided in the antenna electrode 50. The plurality of slits SLa are provided in the dummy electrodes 54. The gap W11 between adjacent parts of the first wound section AT1, the second wound section AT2, and the third wound section AT3, the gap W12 between the dummy electrodes 54 and the antenna electrode 50, the gap W13 between adjacent ones of the dummy electrodes 54, the width W3 of the slit SL, and the width W3a of the slit SLa are sized substantially equally. Consequently, the antenna electrode 50 and the dummy electrodes 54 can be disposed covering the display region 100 with a uniform density across the display region 100. The reflectivity per unit area can be made substantially uniform in the display region 100.

The width of the slit SL and the width of the slit SLa are narrower, and the width of the thin-wire portion TL and the width of the thin-wire portion TLa are wider, in parts more distant from the entrance face E of the light guide plate 83 facing the light source 84 (from the light source 84). The quantity of light emitted to the display region 100 of the display portion 10 is thus made uniform, and the brightness of the display region 100 can be consequently made uniform.

The bridge wire BW can be provided outside the display region 100 by use of a configuration such that: the first wound wire AT1a, which is a part of the first wound section AT1, and the second wound wire AT2a, which is a part of the second wound section AT2, are run through routes on the flexible substrate 73; and the inner peripheral end ATb of the antenna electrode 50 is led out of the antenna electrode 50 via the bridge wire BW straddling these first wound wire AT1a and second wound wire AT2a. This configuration makes it possible to avoid having non-uniform reflectivity within the display region 100.

Furthermore, a force detection process is performed within a period for one video frame while NFC-based short-range wireless communication is not being performed, and the antenna electrode 50 and the dummy electrodes 54 can therefore be used as transmission electrodes for the force detection process. This configuration makes it possible to implement the force detection process without providing any other electrodes in addition to the NFC antenna.

This embodiment can provide a display device that can be equipped with an NFC-based short-range wireless communication capability without increasing the cost and thickening the profile of the display device.

While the embodiment has been described above, the above descriptions are not intended to limit the present invention. The above-described constituent elements in the present invention include those that are readily apparent to the skilled person, those that are substantially the same, and those that fall within the range of equivalents. Any two or more of the constituent elements described above can be used in combination as appropriate. Various omissions, substitutions and changes can be made to the constituent elements without departing from the spirit of the present invention.

The present disclosure includes the following aspects:

(1) A display device comprising:
  a display portion having a display region;
  a backlight configured to illuminate the display region from a back side of the display portion, the backlight including
    a light guide plate, and
    a light source provided facing a lateral side of the light guide plate and configured to emit light;
  an antenna electrode wound around, provided facing a back side of the backlight, and configured to reflect light within the display region in a plan view, the light having entered the light guide plate from the light source; and
  a plurality of dummy electrodes provided on a part of a plane on which the antenna electrode is provided, the part being in a region unoccupied by the antenna electrode,
  wherein the dummy electrodes reflect light within the display region in a plan view, the light having entered the light guide plate from the light source.

(2) The display device according to (1),
  wherein the antenna electrode is formed of a material having the same reflectivity as a material that the dummy electrodes are formed of.

(3) The display device according to (1),
  wherein the antenna electrode comprises a slit therein and comprises thin-wire portions spaced apart from each other with the slit therebetween.

(4) The display device according to (1),
  wherein each of the dummy electrodes comprises a slit therein and comprises thin-wire portions spaced apart from each other with the slit therebetween.

(5) The display device according to (1),
  wherein a gap between adjacent ones of the dummy electrodes, a gap between adjacent parts of the antenna electrode wound around, and a gap between the dummy electrodes and the antenna electrode are sized equally.

(6) The display device according to (3),
  wherein the width of the slit is narrower in a part thereof more distant from the light source, and
  wherein the width of each of the thin-wire portions is wider in a part thereof more distant from the light source.

(7) The display device according to (4),
  wherein the width of the slit is narrower in a part thereof more distant from the light source, and
  wherein the width of each of the thin-wire portions is wider in a part thereof more distant from the light source.

(8) The display device according to (1),
  wherein an inner peripheral end of the antenna electrode is led out of the antenna electrode via a bridge wire straddling the antenna electrode outside the display region.

(9) The display device according to (1), further comprising:
  a detector configured to detect force applied to the display portion,
  wherein, when the detector detects the force, a drive signal is supplied to a transmission electrode in which the antenna electrode and the dummy electrodes are included,
  wherein the display portion includes a reception electrode configured to generate a capacitance between the reception electrode and a corresponding one or more of the antenna electrode and the dummy electrodes, and
  wherein the reception electrode is configured to output a detection signal in accordance with a change in the capacitance when the detector detects the force.

(10) The display device according to (1),
  wherein the light source is provided in a position facing a lateral side of the light guide plate.

(11) A display device comprising:
  a display portion having a display region;
  a backlight configured to illuminate the display region from a back side of the display portion, the backlight including
    a light guide plate,
    a light source provided facing a lateral side of the light guide plate and configured to emit light, and
    a reflective sheet configured to reflect light that has entered the light guide plate from the light source;
  an antenna electrode wound around, provided facing a back side of the backlight, and configured to reflect light within the display region in a plan view, the light having entered the light guide plate from the light source;
  a plurality of dummy electrodes provided on a part of a plane on which the antenna electrode is provided, the part being in a region unoccupied by the antenna electrode; and
  a detector configured to detect force applied to the display portion,
  wherein the dummy electrodes reflect light within the display region in a plan view, the light having entered the light guide plate from the light source,
  wherein, when the detector detects the force, a drive signal is supplied to a transmission electrode in which the antenna electrode and the dummy electrodes are included,
  wherein the display portion includes a reception electrode configured to generate a capacitance between the reception electrode and a corresponding one or more of the antenna electrode and the dummy electrodes, and
  wherein the reception electrode is configured to output a detection signal in accordance with a change in the capacitance when the detector detects the force.

(12) The display device according to (11),
  wherein the antenna electrode is formed of a material having the same reflectivity as a material that the dummy electrodes are formed of.

(13) The display device according to (11),
  wherein the antenna electrode comprises a slit therein and comprises thin-wire portions spaced apart from each other with the slit therebetween.

(14) The display device according to (11),
  wherein each of the dummy electrodes comprises a slit therein and comprises thin-wire portions spaced apart from each other with the slit therebetween.

(15) The display device according to (11),
  wherein a gap between adjacent ones of the dummy electrodes, a gap between adjacent parts of the antenna electrode wound around, and a gap between the dummy electrodes and the antenna electrode are sized equally.

(16) The display device according to (13),
  wherein the width of the slit is narrower in a part thereof more distant from the light source, and
  wherein the width of each of the thin-wire portions is wider in a part thereof more distant from the light source.

(17) The display device according to (14),
  wherein the width of the slit is narrower in a part thereof more distant from the light source, and
  wherein the width of each of the thin-wire portions is wider in a part thereof more distant from the light source.

(18) The display device according to (11),
  wherein an inner peripheral end of the antenna electrode is led out of the antenna electrode via a bridge wire straddling the antenna electrode outside the display region.

What is claimed is:

1. A display device comprising:
a display portion having a display region;
a backlight configured to illuminate the display region from a back side of the display portion, the backlight including
a light guide plate, and
a light source provided facing a lateral side of the light guide plate and configured to emit light;
an antenna electrode wound around, provided facing a back side of the backlight, and configured to reflect light within the display region in a plan view, the light having entered the light guide plate from the light source; and
a plurality of dummy electrodes provided on a part of a plane on which the antenna electrode is provided, the part being in a region unoccupied by the antenna electrode,
wherein the dummy electrodes reflect light within the display region in a plan view, the light having entered the light guide plate from the light source,
wherein each of the dummy electrodes comprises a slit and thin-wire portions spaced apart from each other by the slit,
two of the thin-wire portions adjacent to each other are connected by a wire disposed in the slit, and
a width of the wire is narrower than a width of the slit and narrower than a width of the respective thin-wire portions.

2. The display device according to claim 1,
wherein the antenna electrode is formed of a material having the same reflectivity as a material that the dummy electrodes are formed of.

3. The display device according to claim 1,
wherein the antenna electrode comprises a slit and thin-wire portions spaced apart from each other by the slit.

4. The display device according to claim 3,
wherein, in the antenna electrode, the width of the slit is narrower in a part more distant from the light source, and
wherein, in the antenna electrode, the width of each of the thin-wire portions is wider in a part more distant from the light source.

5. The display device according to claim 1,
wherein a gap between adjacent ones of the dummy electrodes, a gap between adjacent parts of the antenna electrode wound around, and a gap between the dummy electrodes and the antenna electrode are sized equally.

6. The display device according to claim 1,
wherein, in the dummy electrodes, the width of the slit is narrower in a part more distant from the light source, and
wherein, in the dummy electrodes, the width of each of the thin-wire portions is wider in a part more distant from the light source.

7. The display device according to claim 1,
wherein an inner peripheral end of the antenna electrode is led out of the antenna electrode via a bridge wire straddling the antenna electrode outside the display region.

8. The display device according to claim 1, further comprising:
a detector configured to detect force applied to the display portion,
wherein when the detector detects the force, a drive signal is supplied to a transmission electrode in which the antenna electrode and the dummy electrodes are included,
wherein the display portion includes a reception electrode configured to generate a capacitance between the reception electrode and a corresponding one or more of the antenna electrode and the dummy electrodes, and
wherein the reception electrode is configured to output a detection signal in accordance with a change in the capacitance when the detector detects the force.

9. The display device according to claim 1,
wherein the light source is provided in a position facing a lateral side of the light guide plate.

10. A display device comprising:
a display portion having a display region;
a backlight configured to illuminate the display region from a back side of the display portion, the backlight including
a light guide plate,
a light source provided facing a lateral side of the light guide plate and configured to emit light, and
a reflective sheet configured to reflect light that has entered the light guide plate from the light source;
an antenna electrode wound around, provided facing a back side of the backlight, and configured to reflect light within the display region in a plan view, the light having entered the light guide plate from the light source;
a plurality of dummy electrodes provided on a part of a plane on which the antenna electrode is provided, the part being in a region unoccupied by the antenna electrode; and
a detector configured to detect force applied to the display portion,
wherein the dummy electrodes reflect light within the display region in a plan view, the light having entered the light guide plate from the light source,
wherein, when the detector detects the force, a drive signal is supplied to a transmission electrode in which the antenna electrode and the dummy electrodes are included,
wherein the display portion includes a reception electrode configured to generate a capacitance between the reception electrode and a corresponding one or more of the antenna electrode and the dummy electrodes,
wherein the reception electrode is configured to output a detection signal in accordance with a change in the capacitance when the detector detects the force,
wherein each of the dummy electrodes comprises a slit and thin-wire portions spaced apart from each other by the slit,
two of the thin-wire portions adjacent to each other are connected by a wire disposed in the slit, and
a width of the wire is narrower than a width of the slit and narrower than a width of the respective thin-wire portions.

11. The display device according to claim 10,
wherein the antenna electrode is formed of a material having the same reflectivity as a material that the dummy electrodes are formed of.

12. The display device according to claim 10,
wherein the antenna electrode comprises a slit and thin-wire portions spaced apart from each other by the slit.

13. The display device according to claim 12,
wherein, in the antenna electrode, the width of the slit is narrower in a part more distant from the light source, and
wherein, in the antenna electrode, the width of each of the thin-wire portions is wider in a part more distant from the light source.

14. The display device according to claim 10,
wherein a gap between adjacent ones of the dummy electrodes, a gap between adjacent parts of the antenna electrode wound around, and a gap between the dummy electrodes and the antenna electrode are sized equally.

15. The display device according to claim 10,
wherein, in the dummy electrodes, the width of the slit is narrower in a part more distant from the light source, and
wherein, in the dummy electrodes the width of each of the thin-wire portions is wider in a part more distant from the light source.

16. The display device according to claim 10,
wherein an inner peripheral end of the antenna electrode is led out of the antenna electrode via a bridge wire straddling the antenna electrode outside the display region.

* * * * *